United States Patent
Haddadin et al.

(10) Patent No.: US 7,697,641 B2
(45) Date of Patent: Apr. 13, 2010

(54) PARALLEL DSP DEMODULATION FOR WIDEBAND SOFTWARE-DEFINED RADIOS

(75) Inventors: Osama Sami Haddadin, Salt Lake City, UT (US); Brad Terry Hansen, Salt Lake City, UT (US); David S. Nelson, Salt Lake City, UT (US); Roland Richard Henrie, Provo, UT (US)

(73) Assignee: L-3 Communications, New York, NY (US)

( * ) Notice: Subject to any disclaimer, the term of this patent is extended or adjusted under 35 U.S.C. 154(b) by 1345 days.

(21) Appl. No.: 10/878,902

(22) Filed: Jun. 28, 2004

(65) Prior Publication Data

US 2005/0286619 A1 Dec. 29, 2005

(51) Int. Cl.
H04L 27/06 (2006.01)

(52) U.S. Cl. ..................................... 375/340
(58) Field of Classification Search ................. 375/340, 375/316, 329, 324, 219, 349; 370/533, 542; 455/214, 84, 78; 711/173
See application file for complete search history.

(56) References Cited

U.S. PATENT DOCUMENTS

| | | | | |
|---|---|---|---|---|
| 5,559,799 A | * | 9/1996 | Murata et al. | 370/483 |
| 5,612,975 A | * | 3/1997 | Becker et al. | 375/319 |
| 5,619,680 A | * | 4/1997 | Berkovich et al. | 711/173 |
| 5,848,097 A | * | 12/1998 | Carney et al. | 375/219 |
| 5,878,088 A | * | 3/1999 | Knutson et al. | 375/324 |
| 6,154,871 A | * | 11/2000 | Claydon et al. | 714/795 |
| 6,219,386 B1 | * | 4/2001 | Amrany et al. | 375/261 |
| 6,426,983 B1 | * | 7/2002 | Rakib et al. | 375/346 |
| 7,362,998 B2 | * | 4/2008 | Lai | 455/3.02 |
| 2002/0131528 A1 | * | 9/2002 | Clewer et al. | 375/316 |
| 2002/0171485 A1 | * | 11/2002 | Cova | 330/149 |
| 2003/0142698 A1 | * | 7/2003 | Parhi | 370/535 |
| 2004/0056785 A1 | * | 3/2004 | Webster et al. | 341/61 |

* cited by examiner

Primary Examiner—Jean B Corrielus
(74) Attorney, Agent, or Firm—Perman & Green, LLP

(57) ABSTRACT

A demodulator, suitable for use in a communication system and in a modem, has a block polyphase circuit with circuit blocks for different signal processing functions, particularly filtering, delay, and frequency conversion. The circuit blocks are arranged for parallel processing of different portions of an input sequence of signals. Signals of the input sequence to be filtered are divided among the blocks by a demultiplexer for processing at a clock frequency lower than a clock frequency of the input signal sequence. Signals outputted by groups of the circuit blocks are summed to produce an output signal of the group. Output signals of all of the groups are multiplexed to provide an output signal sequence such that the repetition frequency of the outputted signals may be higher, lower, or equal to that of the input signal sequence. This enables use of programmable circuitry operative at reduced clock rates.

38 Claims, 30 Drawing Sheets

$$\begin{bmatrix} Y_0(z) \\ Y_1(z) \\ \vdots \\ Y_{M-2}(z) \\ Y_{M-1}(z) \end{bmatrix} = \begin{bmatrix} G_0(z) & G_1(z) & \cdots & G_{M-2}(z) & G_{M-1}(z) \\ z^{-1}G_{M-1}(z) & G_0(z) & \cdots & G_{M-3}(z) & G_{M-2}(z) \\ \vdots & \vdots & \cdots & \vdots & \vdots \\ z^{-1}G_2(z) & z^{-1}G_1(z) & \cdots & G_0(z) & G_1(z) \\ z^{-1}G_1(z) & z^{-1}G_2(z) & \cdots & z^{-1}G_{M-1}(z) & G_0(z) \end{bmatrix} \begin{bmatrix} X_0(z) \\ X_1(z) \\ \vdots \\ X_{M-2}(z) \\ X_{M-1}(z) \end{bmatrix}$$

FIG.9

$$\begin{bmatrix} Y_0(z) \\ Y_1(z) \\ Y_2(z) \\ Y_3(z) \\ Y_4(z) \\ Y_5(z) \end{bmatrix} = \begin{bmatrix} G_0(z) & G_1(z) & G_2(z) & G_3(z) & G_4(z) & G_5(z) \\ z^{-1}G_5(z) & G_0(z) & G_1(z) & G_2(z) & G_3(z) & G_4(z) \\ z^{-1}G_4(z) & z^{-1}G_5(z) & G_0(z) & G_1(z) & G_2(z) & G_3(z) \\ z^{-1}G_3(z) & z^{-1}G_4(z) & z^{-1}G_5(z) & G_0(z) & G_1(z) & G_2(z) \\ z^{-1}G_2(z) & z^{-1}G_3(z) & z^{-1}G_4(z) & z^{-1}G_5(z) & G_0(z) & G_1(z) \\ z^{-1}G_1(z) & z^{-1}G_2(z) & z^{-1}G_3(z) & z^{-1}G_4(z) & z^{-1}G_5(z) & G_0(z) \end{bmatrix} \begin{bmatrix} X_0(z) \\ X_1(z) \\ X_2(z) \\ X_3(z) \\ X_4(z) \\ X_5(z) \end{bmatrix}$$

FIG.10

$$\begin{bmatrix} Y_0(z) \\ Y_1(z) \\ Y_2(z) \\ Y_3(z) \\ Y_4(z) \\ Y_5(z) \end{bmatrix} = \begin{bmatrix} G_0(z) & G_3(z) \\ z^{-1}G_5(z) & G_2(z) \\ z^{-1}G_4(z) & G_1(z) \\ z^{-1}G_3(z) & G_0(z) \\ z^{-1}G_2(z) & z^{-1}G_5(z) \\ z^{-1}G_1(z) & z^{-1}G_4(z) \end{bmatrix} \begin{bmatrix} X_0(z) \\ X_1(z) \end{bmatrix}$$

FIG.11

$$\begin{bmatrix} Y_0(z) \\ Y_2(z) \\ Y_4(z) \end{bmatrix} = \begin{bmatrix} G_0(z) & G_1(z) & G_2(z) & G_3(z) & G_4(z) & G_5(z) \\ z^{-1}G_4(z) & z^{-1}G_5(z) & G_0(z) & G_1(z) & G_2(z) & G_3(z) \\ z^{-1}G_2(z) & z^{-1}G_3(z) & z^{-1}G_4(z) & z^{-1}G_5(z) & G_0(z) & G_1(z) \end{bmatrix} \begin{bmatrix} X_0(z) \\ X_1(z) \\ X_2(z) \\ X_3(z) \\ X_4(z) \\ X_5(z) \end{bmatrix}$$

FIG. 12

$$\begin{bmatrix} Y_0(z) \\ Y_3(z) \end{bmatrix} = \begin{bmatrix} G_0(z) & G_1(z) & G_2(z) & G_3(z) & G_4(z) & G_5(z) \\ z^{-1}G_3(z) & z^{-1}G_4(z) & z^{-1}G_5(z) & G_0(z) & G_1(z) & G_2(z) \end{bmatrix} \begin{bmatrix} X_0(z) \\ X_1(z) \\ X_2(z) \\ X_3(z) \\ X_4(z) \\ X_5(z) \end{bmatrix}$$

FIG. 13

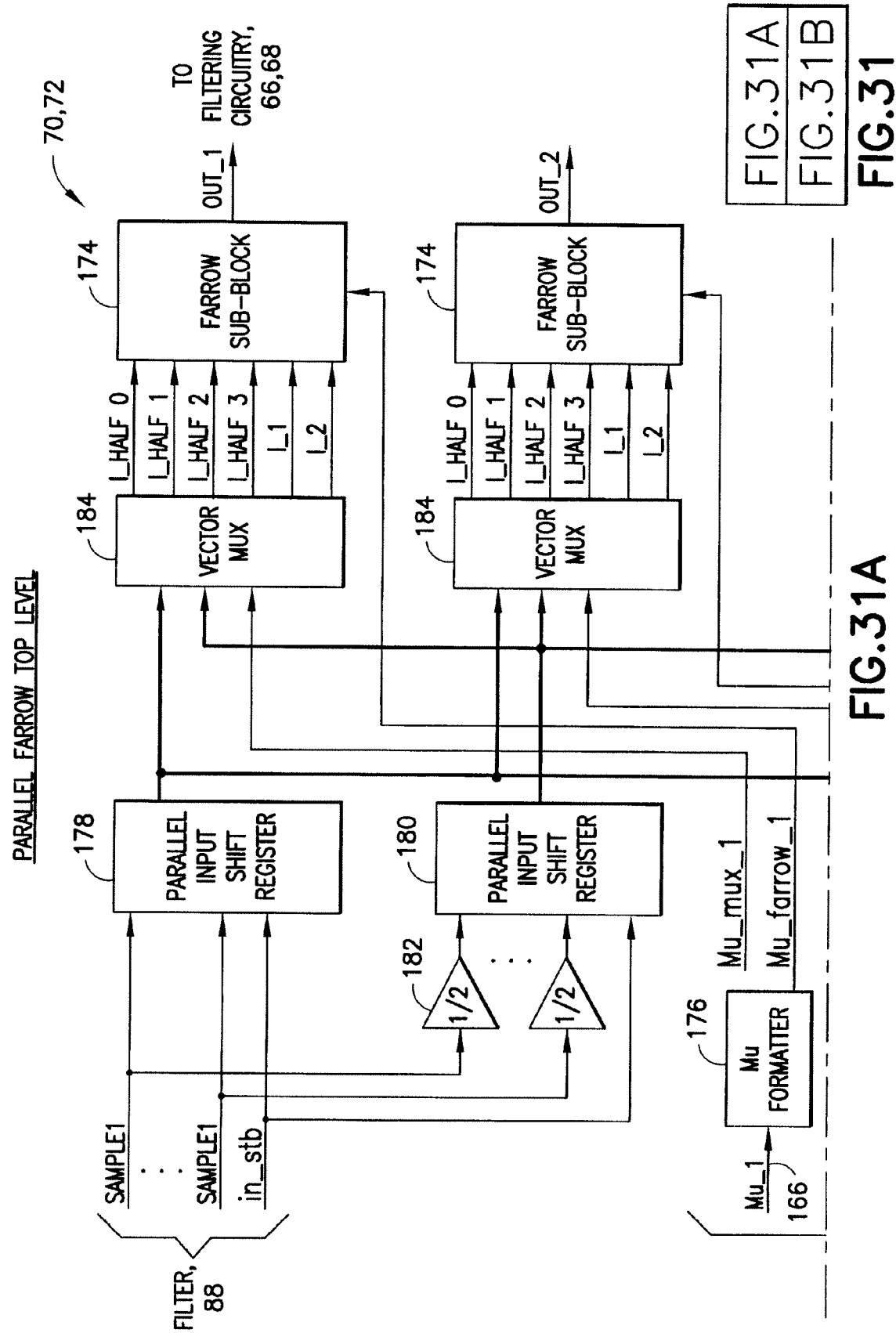

PARALLEL DSP DEMODULATION FOR WIDEBAND SOFTWARE-DEFINED RADIOS

BACKGROUND OF THE INVENTION

1. Field of the Invention

This invention relates to construction of demodulation circuitry suitable for use in communication systems and modems with operation at high signal sample rates and, more particularly, to a construction with parallel signal-processing channels for increased bandwidth, and wherein components of the channels are programmable for handling various signal formats.

2. Brief Description of Related Developments

Communication systems are widely used in many situations including communication between persons, as in cellular telephony, and between various forms of equipment, such as between a satellite and a ground station. Various data formats and protocols have evolved to facilitate communication in differing situations. Communication may involve multiple access technologies such as CDMA (code division multiple access), TDMA (time division multiple access), FDMA (frequency division multiple access), modulation technologies such as PSK (phase shift keying), QAM (quadrature amplitude modulation), and FEC (forward error correction) such as Reed Solomon coding, convolutional encoding, and turbo coding, by way of example.

In high-speed communication systems, digital circuitry is generally employed for processing the communicated signals. There is concern that the digital circuitry should be able to function with sufficient speed to handle the high data rates associated with high-speed communication systems.

There is an interest in programmable modems. Programmability and flexibility of a modem can be achieved by digital modems implemented by use of digital hardware such as field programmable gate arrays (FPGAs) and digital signal processors (DSPs). A modem, constructed for use in a communication system, has a modulation section that prepares a signal for transmission to a distant site, and a demodulation section for reception of an incoming signal. Of particular interest herein is a modem, or other communication device, that can handle signals formatted with different ones of the above-noted multiple access technologies, as well as signals having anyone of several forms of modulation from the above-noted modulation technologies.

Industry today, for both commercial and military applications, is requiring modem hardware that is reconfigurable (programmable) by use of software. By way of example, it would be desirable that a telephone operating in the United States would have the capability to operate in Europe upon a reconfiguration of the software. The technology is known in the industry as software-defined radios, and requires that the hardware be programmable. Digital programmable signal-processing devices such as FPGAs and DSPs are employed in the programmable wireless communications technology. These devices provide great flexibility and programmability, but their use, in the prior art, is at the expense of reduced processing speed, as compared to an application-specific integrated circuit (ASIC) by way of example.

To attain increased hardware flexibility, it is necessary to increase the rate of signal processing. By way of example, an increased rate of signal processing would allow for the transmission and the reception of multiple frequency channels, as in a frequency-division multiplex system, and would allow for digital frequency hopping in frequency-hopping spread spectrum systems, thereby eliminating the need for expensive and bulky synthesizers. Higher signal-processing rates allow for increased signal-transmission rates. It is noted that presently available A/D (analog-to-digital) and D/A (digital-to-analog) converters can operate at rates higher than 1000 million samples per second. In contrast, presently available digital signal processing and generation is accomplished at a much slower rate in a digital signal-processing device such as the FPGA. The most common digital signal processing operation is FIR (finite impulse response) filtering, which appears in modulators and demodulators in the form of various processing functions such as decimation, interpolation, pulse shaping, matched filtering, and equalization, by way of example. Known realizations (implementations) of FIR filters result in filters operable only at reduced signal-processing speed when constructed in FPGAs and DSPs due to the speed limitations of these devices.

By way of example in the construction of a demodulation section of a modem employing digital signal processing, an analog-to-digital converter is employed to convert the incoming analog signal to a digitally formatted signal prior to the implementation of the digital signal processing. The digital signal processing involves various forms of filtering, by way of example, and is accomplished generally by use of computational type circuitry such as field programmable gate arrays (FPGAs) and digital signal processors (DSPs). Circuitry employed for conversion from analog signal format to digital signal format is able to operate at a bit rate that is significantly faster than the bit rate for computational circuitry such as the FPGAs and the DSPs. Therefore, at the present time, the limitation on the digital processing speed of a communication channel is in the nature of the construction of a digital filter that has been implemented by an FPGA or a DSP. While an ASIC may be employed to accomplish a filter function at a higher bit rate than an FPGA or a DSP, the ASIC is designed for a specific signal format or modulation, while the FPGA or the DSP have the advantage of being programmable to be adapted readily for a variety of signal formats and modulations. Thus, the digital signal processing circuitry presently available in FPGAs and DSPs introduce a disadvantageous limitation on the maximum bit rate for digital signal processing, such as the filtering of a signal in a demodulator.

SUMMARY OF THE INVENTION

The aforementioned disadvantage is overcome and other benefits are provided by a demodulator constructed of programmable circuitry, including a DSP or a FPGA, so as to obtain the feature of being adaptable to handle various forms of multiple access technologies and various forms of modulation technologies, and wherein various components of the demodulator are implemented in a parallel form of construction. To accomplish the parallel digital signal processing, the demodulator comprises filters constructed as block polyphase filters for performing filtering operations, and the demodulator further comprises circuitry performing the functions of digital down conversion (from a carrier or intermediate frequency to baseband), digital phase shift, carrier phase and frequency recovery, timing recovery, despreading (direct sequence of frequency hopped) for multiple access, and possibly other circuits providing signal processing functions. Each of these circuits is constructed in a parallel channel form of construction, wherein the parallel channels operate concurrently at a relatively low sample rate for performing digital signal processing on a succession of samples of an input signal.

The design of the demodulator is based on digital signal processing with various functions, preferably all functions, implemented in parallel. This form of construction can be implemented in programmable devices such as an FPGA, or DSP, or other parallel or array processor. Due to the parallel nature of the design, parallel or array processors are more suited than sequential, single arithmetic-logic unit general-purpose processors.

In the implementation of the invention, an input sequence of input signal samples is initially demultiplexed to provide sequences of samples to respective ones of the down conversion channels, with the resulting baseband signals being applied to corresponding channels of the block polyphase filter. At the conclusion of the signal processing associated with the respective channels of the block polyphase filter, the output sequences of samples of the respective channels are multiplexed to provide a single output sample sequence from the filter at the relatively high sample rate of the input sample sequence. Alternatively, the output sample rate can be reduced by decimation or increased by interpolation since the block polyphase construction of filter can readily produce either decimation or interpolation.

In the implementation of the demodulator, the input signal, which may have an analog format, is digitized to provide a digital format. The preferred embodiment of the invention is described with reference to a digital signal processing of a succession of digitized input signal samples. Such processing can be described readily in terms of the mathematics of a Z transformation of the input signal samples for describing operation of a block polyphase filter. The implementation of the filter is accomplished in the time domain.

The block polyphase filter comprises plural groups of filters operated concurrently, wherein the filter groups are arranged in a parallel array between a set of input signals and a set of output signals. Each of the filter groups is composed of a set of filter blocks, each of the filter blocks being a polyphase component of the block polyphase filter. The filter blocks are operated concurrently, and are arranged in a parallel array between the set of input signals and the set of output signals. The filter blocks in all of the filter groups operate at a common clock frequency.

To enable the filter to accommodate a high sampling rate, wherein multiple ones of the input signals arrive in succession within a single period of the clock, the succession of input signals is demultiplexed so that, within each filter group, one input signal is applied to each filter block within one clock period. By way of example, if six input signals, in a sequence of the input signals, appear within one period of the clock, the block polyphase filter is constructed of six filter blocks within each filter group. Thus, by demultiplexing the sequence of the input signals, the rate of application of the signals to respective ones of the filter blocks is reduced to one-sixth of the original rate, and is equal to the clock rate for the processing of signals within a filter block.

The block polyphase filter may have a form of construction wherein there are more filter groups than the number of filter blocks within a filter group, this providing for a succession of output signals at a rate which is greater than the input-signal rate. Alternatively, the block polyphase filter may have a form of construction wherein the number of a the filter groups is equal to the number of filter blocks within a filter group, this providing for a succession of output signals at a rate which is equal to the input-signal rate. As a further alternative, the block polyphase filter may have a form of construction wherein the number of filter groups is less than the number of filter blocks within a filter group, this providing for a succession of output signals at a rate which is lower than the input-signal rate. In the situation of the filter providing for an increased output rate of signals, the filter is providing a function of interpolation, and in the situation of the filter providing for a decreased output rate of signals, the filter is providing a function of decimation.

The characteristics of the individual filter blocks and the filter groups are obtained by a mathematical derivation employing a summation of mathematical terms including the impulse response of the filter, as will be described in detail hereinafter, and leading to a matrix formulation wherein the terms of the matrix are the z transform representations of the filter functions provided by the filter blocks in a filter group. A feature of the matrix is that the arrangement of the terms in successive rows of the matrix is obtained as a permutation of the terms of the first row. Furthermore, the terms located below the diagonal of the matrix also include a delay factor equal to the period of the clock. The multiplication of each row of the matrix by the column of the input signals (in the z-transform notation) involves a summation of products to give an output signal from one filter group. The resulting output signals of the respective filter groups may be multiplexed to provide a succession of the output signals.

The ability of the individual filter blocks of the block polyphase filter to operate at a reduced clock rate permits construction of the respective blocks from a DSP or FPGA which is readily programmed to provide a specific signal processing function. This overcomes the need to employ circuitry, such as an ASIC, especially adapted for high-frequency operation, which circuitry would have little or no programmability. Also, use of the set of channels associated with the demultiplexed sequence of input signal samples presents the opportunity for digital down-conversion, in frequency, in accordance with a feature of the invention, whereby the signal processing associated with digital down-conversion can be accomplished at reduced clock rates permitting the use of FPGAs and DSPs.

The demodulator employs the foregoing block polyphase filters and the digital down conversion in conjunction with other demodulator components such as digital phase shift circuitry, numerically controlled oscillators, timing correction circuitry that includes fractional delay/interpolation filters, as well as circuitry providing detection of timing error and carrier phase error. In addition to the block polyphase filters and the digital down conversion circuitry, which are implemented in the parallel mode of construction, other ones of the demodulator components are also implemented in the parallel mode of construction to attain the benefits of the invention. By storing various programs for use in the programmable circuitry (DSP and FPGA) of the demodulator, the demodulator attains the versatility to handle the various multiple-access and modulation technologies described above, while providing the capability to handle signals of higher clock rates and higher bandwidth. It is noted that the invention, in terms of the feature of the parallel mode of construction, can be built as an ASIC to attain a faster signal processing speed, but without the benefit of the programmability provided by the programmable circuitry of a DSP or FPGA. The invention can be implemented also in other programmable devices such as multi-node or parallel or vector (array) processors that contain multiple processing units (such as multipliers and accumulators).

BRIEF DESCRIPTION OF THE DRAWING

The aforementioned aspects and other features of the invention are explained in the following description, taken in connection with the accompanying drawing figures wherein:

FIG. 9 shows a matrix equation, having a general form, for explaining operation of the filters of FIG. 5-8;

FIG. 10 shows a matrix equation representing the operation of the filter of FIG. 6 for an equal number of input and output signal channels;

FIG. 11 shows a matrix equation representing the operation of the filter of FIG. 5 for a smaller number of input channels than output channels, thereby providing the function of interpolation;

FIGS. 12-13 show matrix equations representing the operations of the filters of FIGS. 7-8 for a larger number of input channels than output channels, thereby providing the function of decimation;

Identically labeled elements appearing in different ones of the figures refer to the same element but may not be referenced in the description for all figures.

DETAILED DESCRIPTION OF THE INVENTION

The ensuing description begins by showing the basic components of a communication system and of a modem. This is followed by further detail in the construction of a demodulator for use in either the communication system or in the modem. The description of the demodulator then continues with detail in: 1. Construction of block polyphase filters; 2. Digital Down-Conversion and Carrier NCO; and 3. Fractional Delay (or interpolation) Filter and Timing NCO.

Figure 1:
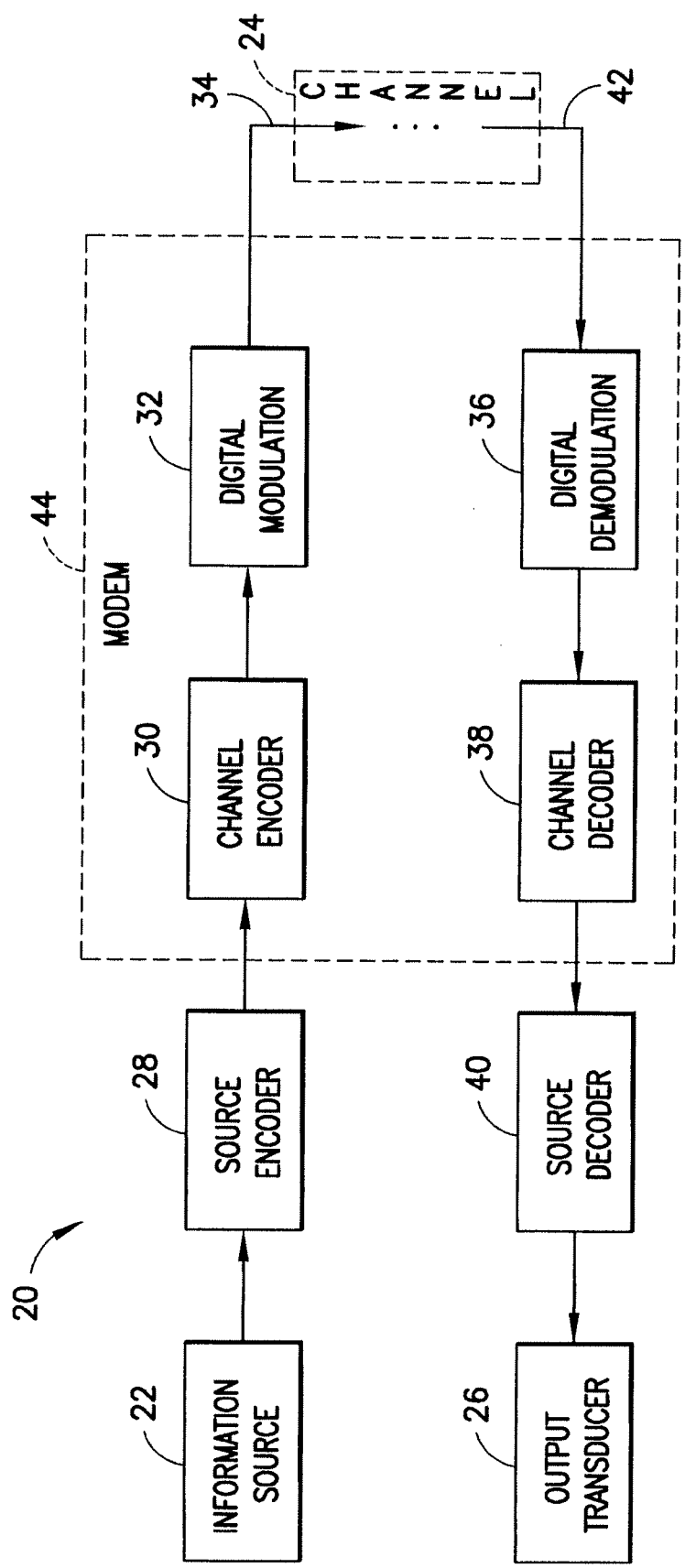
FIG. 1 is a block diagram of a communication system employing a demodulator in accordance with the invention.

FIG. 1 shows a basic communication system 20, wherein information, provided by a source 22, is communicated by a communication channel 24 to be outputted by a transducer 26. The information source 22, along with a source encoder 28, a channel encoder 30 and a digital modulator 32 are located on a transmit side 34 of the communication channel 24. The output transducer 26, along with a digital demodulator 36, a channel decoder 38 and a source decoder 40 are located on a receive side 42 of the communication channel 24.

The information provided by the source 22 is encoded first by the source encoder 28 and then by the channel encoder 30, the encoding being followed by digital modulation in the modulator 32 preparatory to transmission via the communication channel 24. Signals received from the communication channel 24 undergo digital demodulation at the demodulator 36, the demodulation being followed by decoding in the channel decoder 38 and by further decoding in the source decoder 40, whereupon the decoded signals are applied to the output transducer 26. The channel encoder 30 and the digital modulator 32 are employed with other equipment, such as carrier up-conversion and filtering, employed in the transmission of signals. The demodulation of the digital demodulator 36 is accomplished with carrier down-conversion and filtering (to be described hereinafter, but not shown in FIG. 1) employed in the reception of signals.

The description of the communication system 20 presents a one-way communication of data from the information source 22 to the output transducer 26. For two-way communication via outgoing and incoming communication channels, a first modem and a second modem, each having both modulation and demodulation sections as provided by a modem 44, would be employed. The modem 44 is indicated in FIG. 1 by means of a dashed line enclosing components of the modem 44, these components including the channel encoder 30 and the digital modulator 32 for the transmission of signals, and the digital demodulator 36 and the channel decoder 38 for the reception of signals. To implement the two-way communication, the modulation section of the first modem would be connected to the transmit side of the outgoing communication channel for transmission of an outgoing signal, and the demodulation section of the second modem would be connected to the receive side of the outgoing communication channel for reception of the outgoing signal. The demodulation section of the first modem would receive a signal on the receive side of an incoming communication channel, which signal is transmitted by the modulation section of the second modem into the transmit side of the incoming communication channel. This description of the demodulation operation of the modem 44 is a simplified description, and a more detailed description of the demodulator 36 will be provided hereinafter with reference to FIGS. 2-4. Generally speaking, the modem 44 provides the functions of the channel encoder/decoder and of the digital modulation/demodulation.

The present invention may be employed for construction of components of a modem, such as the modem 44, as well as for construction of components of a communication system, such as the system 20. In the practice of the invention, the utilization of programmable circuitry, such as an FPGA or a DSP, is useful in situations wherein a communications device is required to switch rapidly between multiple modes of communication, and this applies equally to use of the demodulator 36 in the construction of a modem as well as to the construction of a communication system. By way of example, the invention is particularly useful in time-division multiplexing or burst-like communication in which each burst or time slot requires specific characteristics of a modem or communication system, which characteristics differ from a previous time slot or from a subsequent time slot. The specific characteristics are readily attained by the programmable circuitry employed with the invention.

The information source 22, by way of example, may be a computer generating digital data (images, video and speech), a video camera converting optical signals to analog electrical signals, or a microphone converting sonic signals to analog electrical signals. The source encoder 28 operates to convert the analog or digital data signals of the information source 22 into a bit stream. Also, the source encoder 28 performs data compression, and outputs a sequence of binary digits to the channel encoder 30. The channel encoder 30 operates to introduce, in a controlled manner, redundancy in a binary information sequence of the bit stream, which redundancy can be used at a receiver to overcome effects of noise and interference which may be encountered in the transmission of a signal through the communication channel 24. The added redundancy serves to increase the reliability of the received data.

Examples of codes provided by channel encoders include convolutional codes (decoding using the Viterbi algorithm), Turbo codes, and interleaving for channels with burst errors. The binary sequence outputted by the channel encoder 30 is applied to the digital modulator, which serves as the interface to the communication channel 24. The primary purpose of the digital modulator 32 is to map the binary information sequence (data bits) into signal waveforms. The digital modulator 32 performs a shaping of a signal pulse in the time or frequency domain, as well as providing modulation of a carrier. In the case wherein the communication channel is characterized by radiation of the signal into the atmosphere, coupling of a signal from the communication channel 24 to the demodulator 36 may be via an antenna (not shown in FIG. 1, but shown in FIG. 2). Generally speaking, the communication channel 24 is the physical medium that is used to send a signal from a transmitter, located at the transmit side 34 of the communication channel 24, to a receiver, located at the receive side 42 of the communication channel 24. In the case of wireless transmission, the communication channel 24 may be the atmosphere (free space). Such physical medium, in the case of telephone channels, may include wire lines, optical fiber cables, and wireless (microwave radio).

In FIG. 1, at the receive side 42, the demodulator 36 processes the signal received via the communication channel 24, which signal may have been corrupted, and reduces the signal into a sequence of numbers that represent estimates of the transmitted data. The sequence of numbers is passed to the channel decoder 38. The channel decoder 38 reconstructs the original information sequence from knowledge of the codes used by the channel encoder 30 and the redundancy contained in the received data. Since the demodulator 36 employs an oscillator that operates independently of a transmitter of the signal, carrier phase and frequency recovery and symbol timing recovery are needed, and circuitry providing these functions will be described below.

The encoding circuitry and the modulation circuitry provide for a variety of signaling formats, in addition to the aforementioned convolutional encoding and Turbo coding, such as CDMA, TDMA, PSK, QAM, and Reed Solomon coding. More specifically, such circuitry provides data processing or formatting for error correction and phase ambiguity resolution for multiuser (TDMA, FDMA and CDMA), spread spectrum by direct sequence (DS) or frequency hopped (FH), and modulation/signaling (PSK, QAM, MSK). The demodulation circuitry and the decoding circuitry provide the inverse of the foregoing encoding and demodulation circuits to recover the information outputted by the source 22. While the modulation circuitry and the encoding circuitry, as well as the demodulation and decoding circuitry, may comprise a set of ASICs of which an individual ASIC may provide a specific form of the signal formatting, a preferred embodiment of the invention is constructed of programmable circuitry such as a DSP or a FPGA operative with any one of several programs which may be selected to provide the desired signal formatting. Limited programming may be provided in the ASIC if additional circuitry for the additional functions is built into the ASIC.

Digital processing is readily accomplished in the FPGA. The use of the FPGA is preferred in the construction of the invention because it enables one piece of equipment to be employed for handling any one of several possible signal formatting options. Alternatively, a DSP may be employed for a reduced throughput speed but increased programming capability. An ASIC may also be employed for maximum throughput speed in the situation wherein only a single format is anticipated, or also in any of a plurality of formats if the ASIC is constructed with the additional circuitry required for carrying forth the additional formats.

Figure 2:
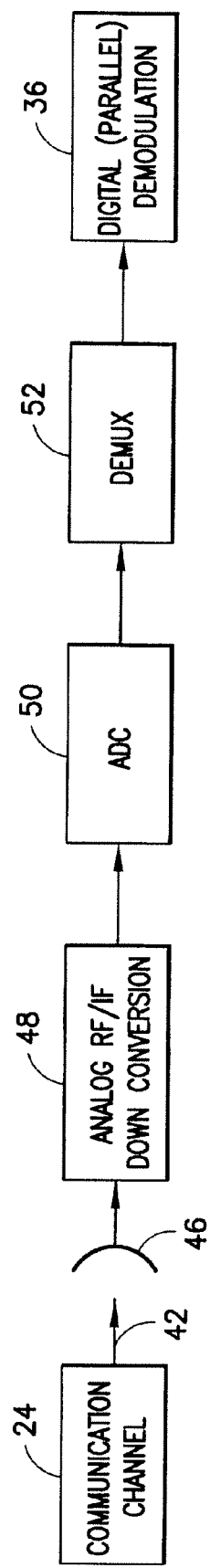
FIG. 2 is a block diagram showing further detail in a connection of the demodulator to a communication channel of the system of FIG. 1.

FIG. 2 shows utilization of an antenna 46 for coupling electromagnetic signals from the communication channel 24 to the demodulator 36 of FIG. 1. In FIG. 2, the signal received by the antenna 46 is processed by analog down-conversion circuitry 48 providing for a frequency down-conversion from RF to IF. The received signal at IF is then converted from analog format to digital format by an analog-to-digital converter (ADC) 50. The digitized received signal outputted by the converter 50, on a single signal channel, is processed by a demultiplexer 52 to apply the signal via a set of parallel channels to the demodulator 36.

Figure 3:
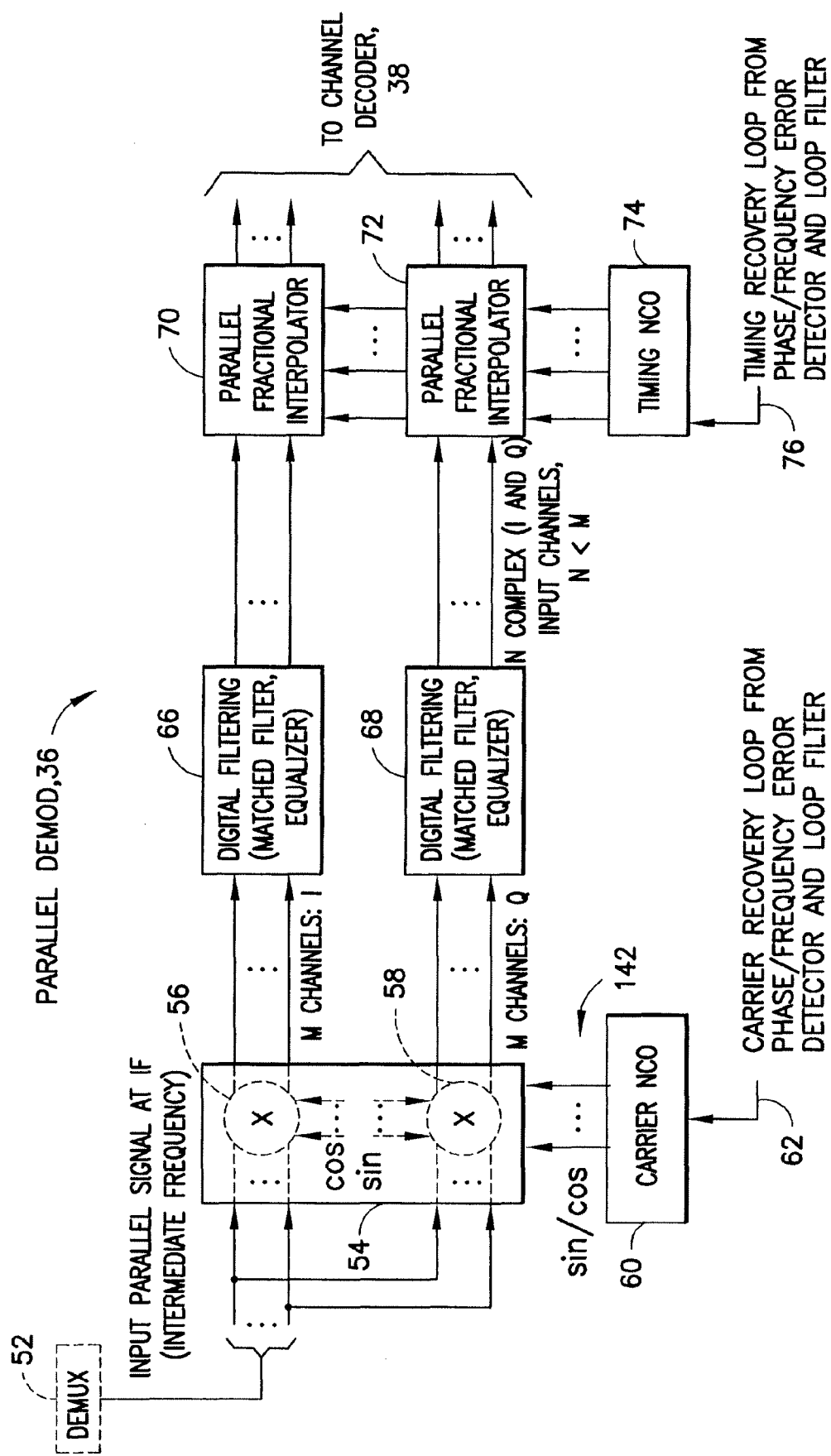
FIG. 3 is a simplified block diagram of the demodulator of FIG. 1.
Figure 4A:
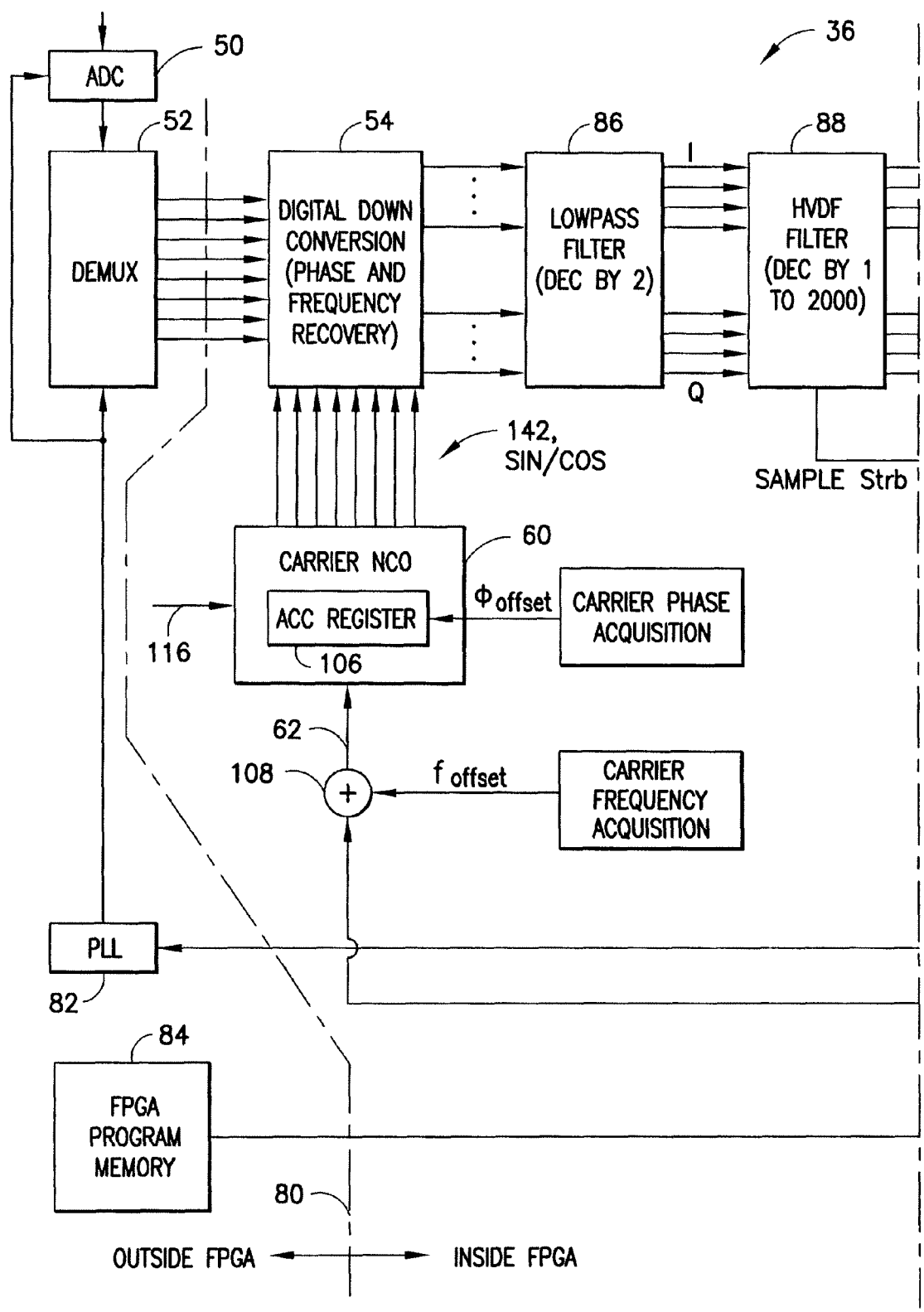
FIG. 4 (FIG. 4A and FIG. 4B is a detailed block diagram of the demodulator of FIG. 1, and shows also despreading functionality employed for direct sequence spread spectrum or code division multiple access.
Figure 4B:
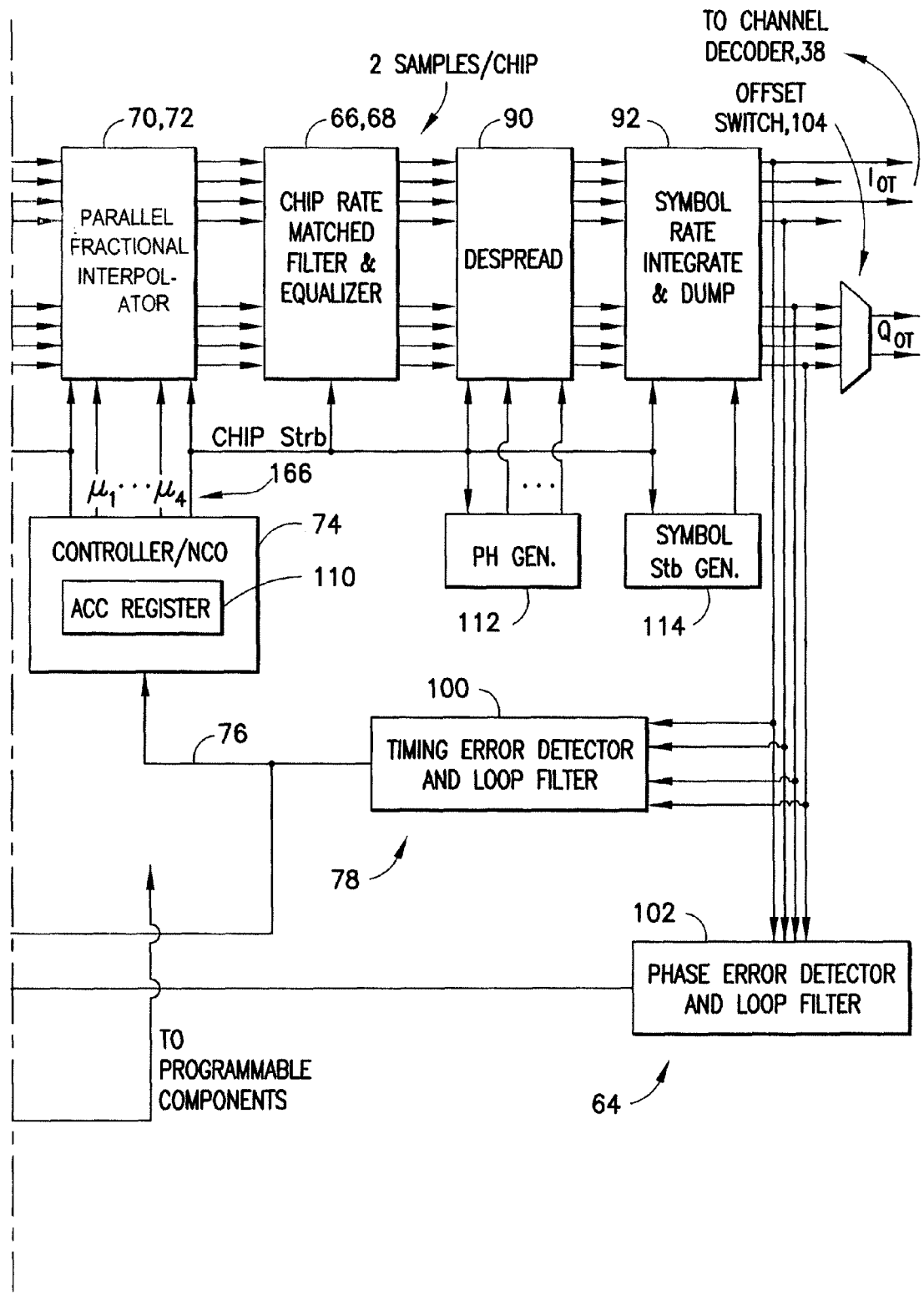

FIG. 3 shows a simplified view of the digital demodulator 36 constructed of the parallel signal channels, a more detailed view being provided by FIG. 4. In FIG. 3, the input signal to the demodulator 36 is provided as a set of parallel signal channels by the demultiplexer 52 (as described with reference to FIG. 2), the input signal being applied to digital down-conversion circuitry 54 of the demodulator 36. The down-conversion circuitry 54 includes multipliers 56 that operate to translate the input signal from an intermediate frequency to baseband and to output the inphase (I) component of the baseband signal. Further multipliers 58 of the down-conversion circuitry 54 translate the input signal from the intermediate frequency to baseband for outputting the quadrature (Q) component of the baseband signal. A numerically controlled oscillator (NCO) 60 provides carrier reference signals for operation of the multipliers 56 and 58, wherein a cosine phase reference signal is provided to the inphase multipliers 56 and a sine phase reference signal is applied to the quadrature multipliers 58. The carrier frequency outputted by the carrier NCO 60 is established by a control signal, applied via line 62, from a carrier recovery loop 64 (shown in FIG. 4).

The demodulator 36 further comprises parallel-channel digital filtering circuitry 66 and 68, parallel-channel interpolation circuitry 70 and 72 including circuitry with a Farrow structure, and a numerically controlled oscillator (NCO) 74 providing timing reference signals for operation of the interpolation circuitry 70 and 72. The filtering circuitry 66 and 68 provides functions including matched filtering and equalization. The filtering circuitry 66 receives M inphase signal channels from the multipliers 56, where M is the number of the inphase channels. The filtering circuitry 68 receives M quadrature signal channels from the multipliers 58, where M is the number of the quadrature channels. The number of channels N outputted by the filtering circuitry 66,68 may differ from the number of input channels, as in the case, by way of example, where a filter performs decimation and N is less than M. Signals outputted from the filtering circuitry 66 and 68 are applied respectively to the interpolation circuitry 70 and 72. By way of an alternative arrangement of the components, as shown in FIG. 4, the fractional interpolation circuitry 70, 72 may precede various functions of the filtering circuitry 66, 68. As shown in FIG. 3, the timing NCO 74 provides complex time reference signals for operation of the interpolation circuitry 70 and 72 including portions of the circuitry, wherein the inphase reference is provided to the inphase interpolation circuitry 70 and the quadrature reference is applied to the quadrature interpolation circuitry 72. The set of timing signals outputted by the timing NCO 74 is established by a control signal, applied via line 76, from a timing recovery loop 78 (shown in FIG. 4). Output signals of the demodulator 36 are applied to the channel decoder 38, as indicated in FIGS. 1, 2 and 4.

FIG. 4 shows further detail in the construction of the demodulator 36, components of the demodulator 36 being shown to the right of a dashed line 80. Further components including the previously described analog-to-digital converter 50 and the demultiplexer 52 are shown to the left of the line 80. Also shown to the left of the line 80 are a phase locked loop (PLL) 82 and a program memory 84. The PLL 82 provides timing signals for operation of the A/D converter 50 and the demultiplexer 52 based on reference timing signals that are applied to the PLL 82 from line 76 of the timing recovery loop 78. In accordance with a feature of the invention, the components of the demodulator 36, shown to the right of the line 80, can be fabricated on an FPGA of programmable circuitry so as to accommodate various signal formats, as described above. Various programs may be stored in the program memory 84 to be applied to various ones of the demodulator components shown to the right of the line 80. A specific one of the stored programs, to be employed for operation of the demodulator 36, may be selected by a user of communication equipment having the demodulator 36.

With fabrication of the equipment by an FPGA, all digital processing can be accomplished in the FPGA. The use of the FPGA is preferred in the construction of the invention because it enables one piece of equipment to be employed for handling any one of several possible formatting options. Alternatively, a DSP may be employed for a reduced throughput speed but increased programming capability. An ASIC may also be employed for maximum throughput speed in the situation wherein only a single format is anticipated, or also in any of a plurality of formats if the ASIC is constructed with the additional circuitry required for carrying forth the additional formats. In the cases of the FPGA and the DSP, optional coding and modulation may be provided for by including in memories of the FPGA and of the DSP instructions for the optional coding and modulation.

By way of example in the operation of the demodulator 36, FIG. 4 shows the demultiplexer 52 converting a sequence of input signal samples, received from the A/D converter 50, into a set of eight parallel channels of samples of input signals collectively carrying the input signal samples. Each channel operates at a reduced sample rate, in this example, of only one-eighth of the sample frequency of the signal outputted by the A/D converter 50. The use of the eight parallel channels enables the down-conversion circuitry 54 and the following components of the demodulator 36 to function at a lower clock rate with four inphase signal channels and four quadrature signal channels, in accordance with a feature of the invention.

The demodulator 36 may include also, by way of example, a low pass filter 86 with decimation by a factor of 2, and a further filter 88 providing a higher value of decimation. The filters 86 and 88 have inphase and quadrature sections, and are arranged serially between the down-conversion circuitry 54 and the fractional delay of the interpolation circuitry 70, 72 (indicated by a single block in FIG. 4). The fractional delay of the interpolation circuitry 70, 72 is followed by the filtering circuitry 66, 68 (indicated by a single block in FIG. 4) providing matched filter and equalization functions, followed by further signal processing in a circuit 90 providing the function of signal de-spreading and in a circuit 92 providing the function of symbol-rate integrate and dump. The de-spread circuit 90 is employed for direct-sequence spread spectrum signal waveforms. The integrate-and-dump operation of circuit 92 can be implemented as a filter. Output signals of the integrate-and-dump circuit 92 are applied to circuitry 100 providing the functions of timing error detection and loop filtering of the timing recovery loop 78, and are applied also to circuitry 102 providing the functions of phase error detection and loop filtering of the carrier recovery loop 64. Output signals of the integrate-and-dump circuit 92 are applied also, via an offset switch 104 to another component of a communication system such as the channel decoder 38 of FIG. 1.

With respect to the operation of the carrier recovery loop 64 and the timing recovery loop 78, the carrier NCO 60 includes a register 106 to receive a phase offset to aid in the acquisition of carrier phase. Also, a summer 108 is connected between the carrier NCO 60 and the loop filter of the circuitry 102 to add a frequency offset to the output of the loop filter of the circuitry 102 to give a command on line 62 for acquiring the carrier frequency. A corresponding register 110 is provided in the timing NCO 74 to facilitate a closing of the timing loop to null the timing error. A pseudo-noise (PN) generator 112 provides timing signals, in response to a strobing from the timing NCO 74, which also serves as a controller, to operate the de-spread circuit 90. The PN generator 112 generates the code required for despreading a direct sequence spread spectrum signal, and is controlled by the NCO 74 because it is required to be synchronized with the code on the incoming signal. A symbol-strobe generator 114 provides timing signals, in response to a strobing from the timing NCO 74, to operate the integrate-and-dump circuit 92. The controller/timing NCO 74 applies timing and/or strobe signals to the filter 88, the fractional delay of the interpolation circuitry 70, 72 and the filtering circuitry 66, 68. In the operation of the phase recovery loop 64, the circuitry 102 detects a phase error in the output signals of the integrate-and-dump circuit 92, and outputs a signal to the carrier NCO 60 commanding an adjustment of frequency to null the phase error. A nominal value of frequency for the carrier NCO 60 is input at 116. In similar fashion, in the operation of the timing recovery loop 78, the circuitry 100 detects a timing error in the output signals of the integrate-and-dump circuit 92, and outputs a signal to the timing NCO 74 commanding an adjustment in the timing of strobe signals to null the timing error.

Block Polyphase Filter Construction

Figure 5:
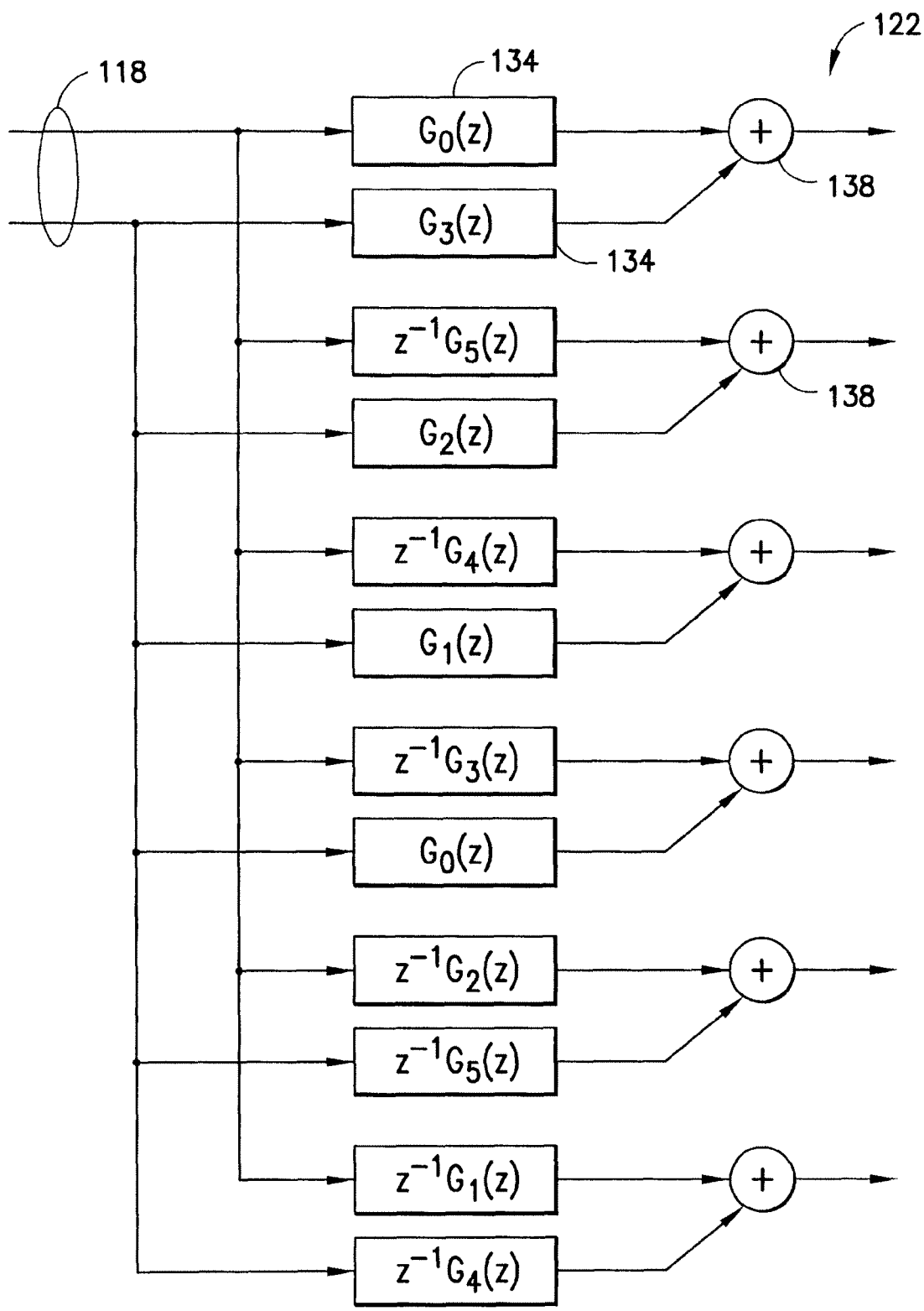
FIGS. 5-8 provide examples in construction of various embodiments of block polyphase filters in accordance with the invention.
Figures 6, 6A:
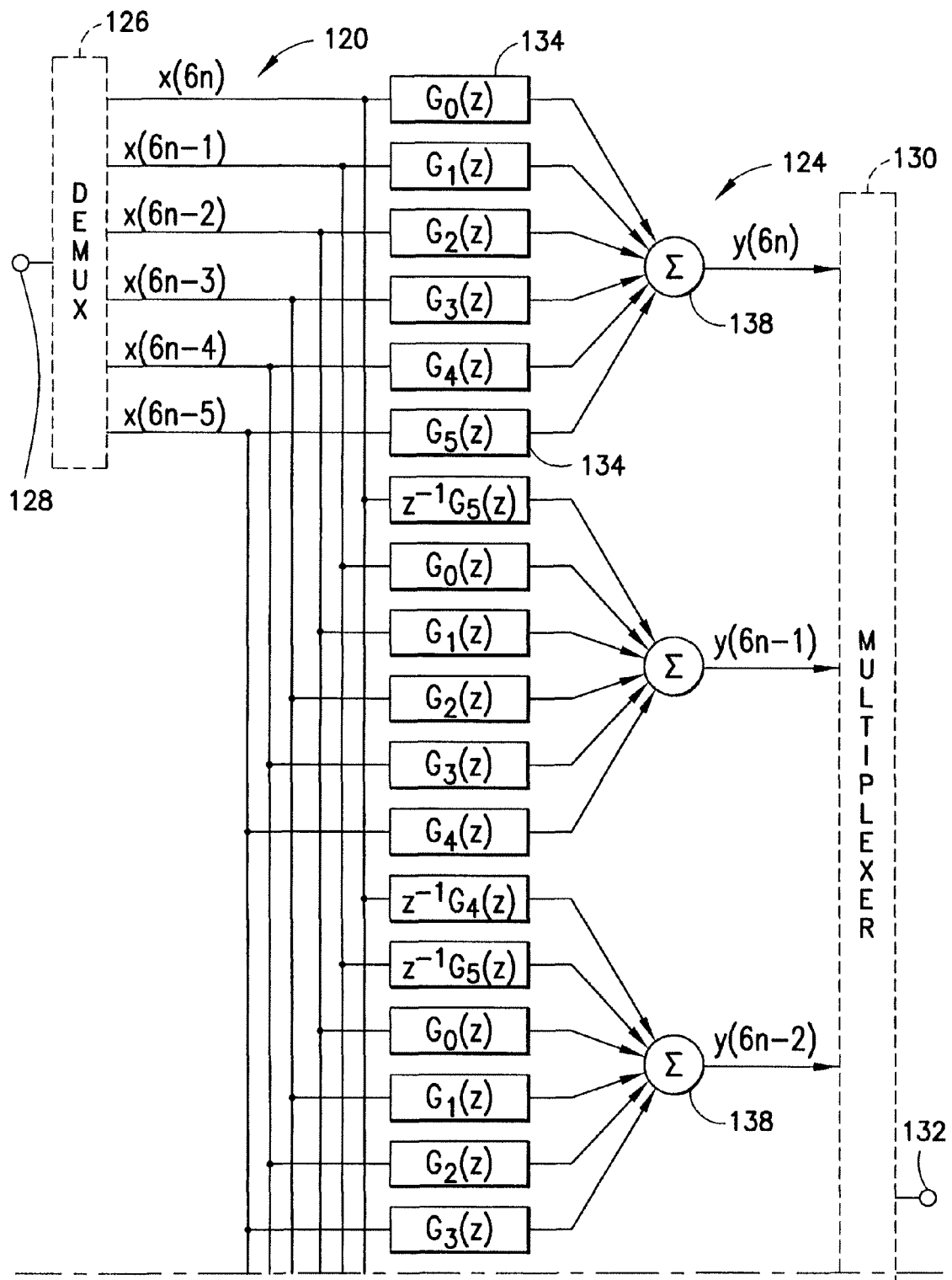
Figure 6B:
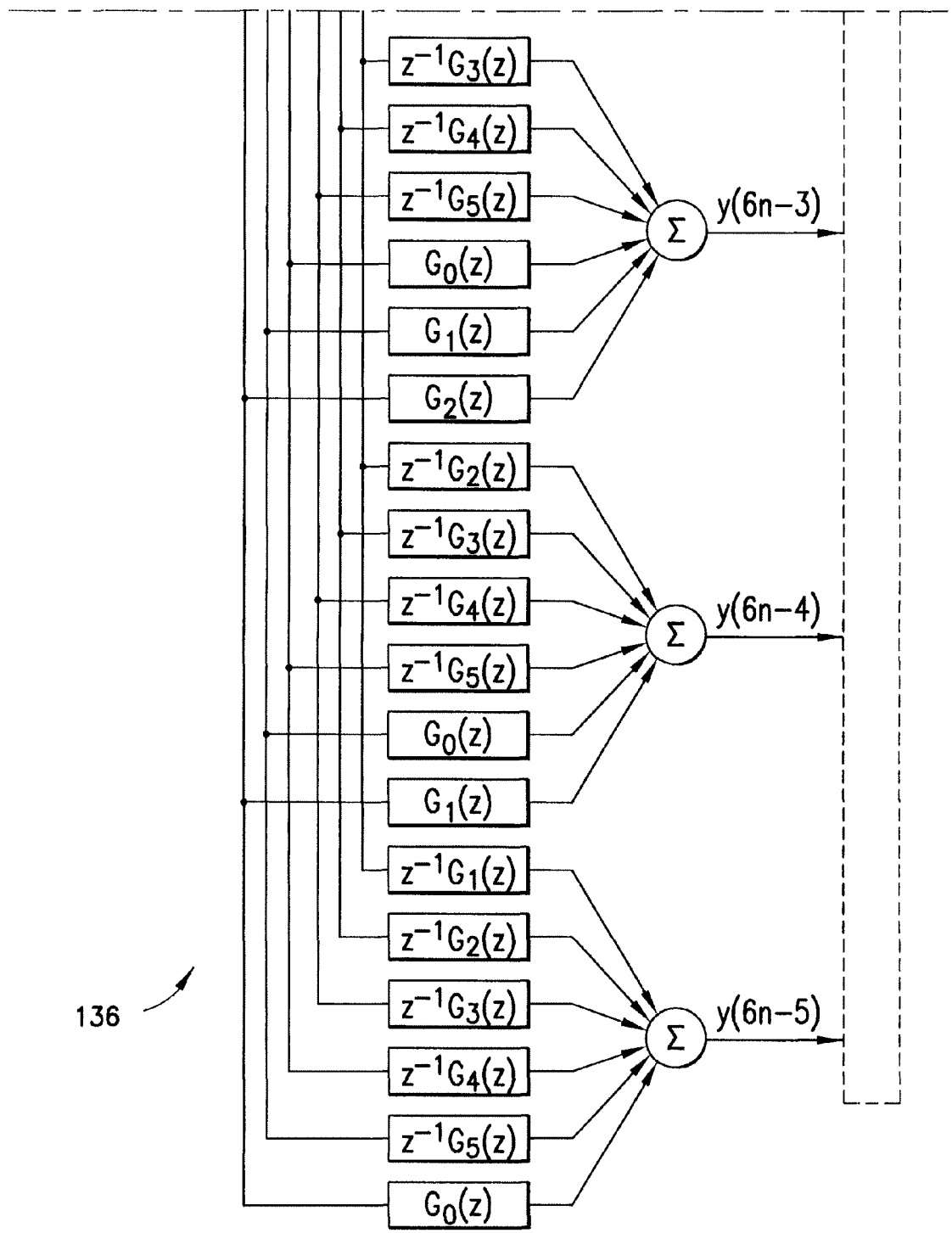
Figure 7:
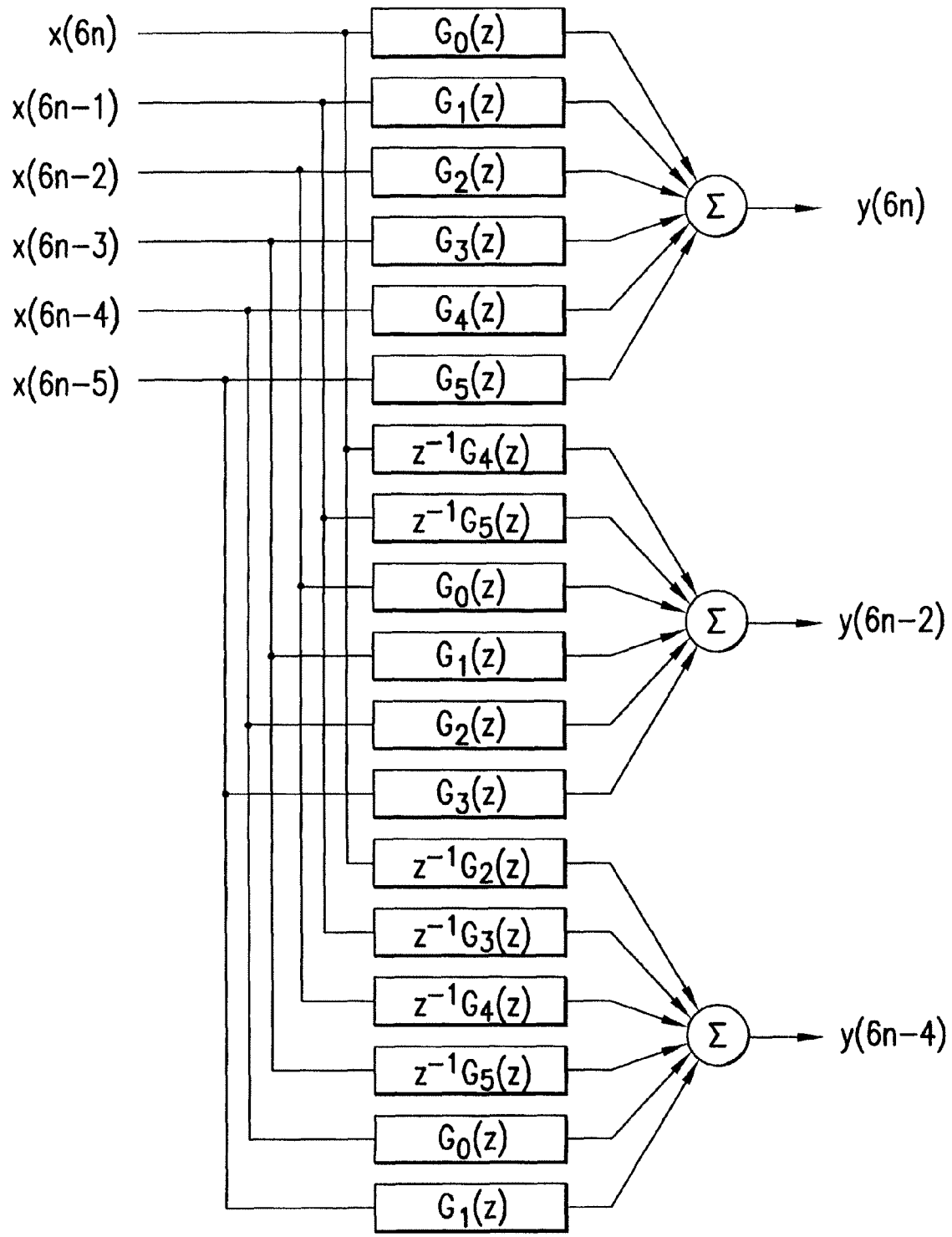
Figure 8:
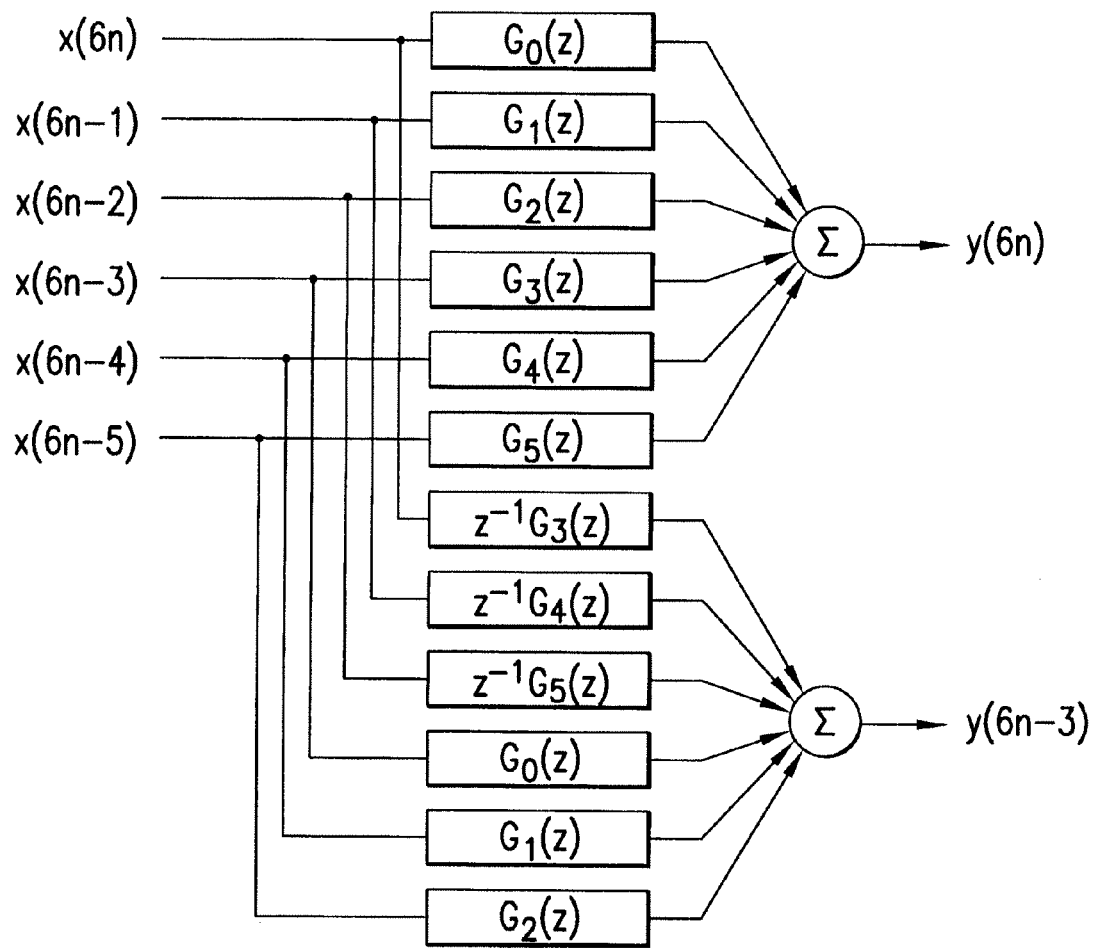

FIGS. 5-8 show, in block diagrammatic form, four manifestations of filters constructed in the block polyphase form of the invention. This form of construction may be employed for constructing the filters in the circuitry 66, 68 of FIGS. 3-4 as well as the filters 86, 88 of FIG. 4. Each of the filters of FIGS. 5-8 is described in terms of a filter function represented in Z-transform notation as G(z) wherein a subscript i (i is an integer), as an $G_i(z)$, identifies a polyphase component of the filter. As will be explained subsequently, the filter function is expressed as a mathematical series of which individual terms of the series are identified with the respective ones of the filter components. The filters differ in terms of the ratio of the number of input terminals to the number of output terminals in each of the filters. Thus, FIG. 5 shows a filter having two input terminals and six output terminals, and provides a function of interpolation by a factor of three, with a resulting increase in the sample rate by a factor of three. FIG. 6 shows a filter having six input terminals and six output terminals, and provides a function of parallel processing without a change in the sample rate. FIG. 7 shows a filter having six input terminals and three output terminals, and provides a function of decimation by a factor of two, with a resulting decrease in the sample rate by a factor of two. FIG. 8 shows a filter having six input terminals and two output terminals, and provides a function of decimation by a factor of three, with a resulting decrease in the sample rate by a factor of three.

The operation of a filter having the form of the filter of FIG. 6, wherein the number of input terminals is equal to the number of output terminals, is expressed mathematically by a matrix equation, presented in FIG. 9, for any number of input terminals, wherein each of a plurality of outputs of the filter is obtained by a combination of all of the inputs of the filter multiplied by designated coefficients, as set forth in the matrix equation. Also included in the diagrams of FIGS. 5-8, as well as in the equation of FIG. 9, is a delay factor $z^{-1}$ that represents a delay of one period of the clock which drives the filter. FIG. 10 shows the matrix equation of FIG. 9 for the case of the six input terminals and the six output terminals of the filter of FIG. 6. FIG. 11 shows the matrix equation for the filter of FIG. 5, which is derived from the equation of FIG. 10 by deletion of the second column, the third column, the fifth column and the sixth column of the matrix of FIG. 10. FIG. 12 shows the matrix equation for the filter of FIG. 7, which matrix equation is derived from the equation of FIG. 10 by deletion of the second row, the fourth row, and the sixth row of the matrix of FIG. 10. FIG. 13 shows the matrix equation for the filter of FIG. 8, which matrix equation is derived from the equation of FIG. 10 by deletion of the second row, the third row, the fifth row and the sixth row of the matrix of FIG. 10.

In the filter of FIG. 5 the two input lines represent the two input signal channels and are indicated at 118, and the filter of FIG. 6 is shown to have six input lines for six input channels, indicated at 120. The signals for the input lines 118 and 120 may be provided by a demultiplexer, such as the demultiplexer 52 of FIGS. 2-4, or alternatively, by the output lines of a preceding filter, as in the case of the low pass filter 88 of FIG. 4 which receives its set of input signals from the corresponding set of output signals of the low pass filter 86.

In the filter of FIG. 5 the six output lines represent six output channels and are indicated at 122, and in the filter of FIG. 6 the six output lines representing six output channels are indicated at 124. The signals outputted by the output lines 122 and 124 may be applied to a multiplexer or, alternatively, may be applied to the input lines of a following filter. To facilitate visualization of the operation of the filters of FIGS. 5-8, in FIG. 6 a demultiplexer 126 is shown in phantom to demonstrate how the signals for successive ones of the six input lines 120 can be obtained from a single sequence of the signals applied to the demultiplexer 126 by a single line 128. Also, a multiplexer 130 is shown in phantom to demonstrate how the signals from successive ones of the six output lines 124 can be multiplexed onto a single line 132 for communication to a further component of a signal processing device, by way of example. The operations of the demultiplexer 126, the multiplexer 130, and individual blocks 134 of the filter 136 of FIG. 6 are controlled by timing signals such as the timing signals provided by the timing NCO 74 of FIG. 4. Thereby, the operations of the individual filter blocks 134 of FIG. 6 can be conducted in parallel to give an effective rate of operation to the overall filter 136 which is much greater than the rate of operation of any one of the filter blocks 134.

By way of example in the operation of the demultiplexer 126 in FIG. 6, in the first set of six signals appearing in the serially supplied signals at line 128, the first signal, x(6n−5), is applied to the filter block 134 identified as $G_5(z)$ in the first set of six blocks 134 as well as to other blocks in further ones of the sets of six blocks 134, the second signal, x(6n−4), is applied to the filter block identified as $G_4(z)$ as well as to other blocks in further ones of the sets of six blocks 134, with the process continuing in similar fashion until the sixth of the signals is applied to the block identified as $G_0(z)$ in the first set of six blocks 134. The seventh signal of the input series of signals at line 128 is applied by the demultiplexer 126 to the same blocks 134 which received the first signal, and the eighth signal of the input series is applied to the same blocks 134 which received the second signal, with the process continuing in this fashion. Thereby, each of the filter blocks 134 in any one set of the six blocks receives only specific ones of the signals of the input sequence on line 128 and, in this example wherein there are only six filter blocks 134 in any one of the six sets of the filter blocks, the signals are received at the individual filter blocks 134 at a rate which is only one-six of the rate at which signals are received via line 128 at the demultiplexer 126.

With reference to FIG. 9, the mathematical description of the operation of a block polyphase (matrix) altering operation is presented in the z-domain by a matrix equation wherein the column matrix on the left side of the equation represents a set of output signals of the filtering operation, and the column matrix on the right side of the equation represents a set of input signals to the filtering operation. In the center square matrix, $G_0(z), G_1(z), \ldots$ are the polyphase components of the filter $G(z)$; $X_0, X_1, \ldots$ are the demultiplexed channels of the input signal $X(z)$; and $Y_0, Y_1, \ldots$ are the demultiplexed channels of the output signal $Y(z)$. The input signal $X(z)$ is given, in the time domain, by $x_k(n)=x(Mn-k)$ for $K=0, \ldots, M-1$. The output signal $Y(z)$ is given, in the time domain, by $Y_k(n)=y(Mn-k)$ for $K=0, \ldots, M-1$. The terms in successive rows of the matrix are presented as a permutation of the order of the terms appearing in the first row of the matrix. Terms of the matrix appearing below the diagonal of the matrix have the additional delay factor $z^{-1}$.

For the case of a filter function represented by the six terms, $G_0(z)$ through $G_5(z)$, appearing in FIG. 6, the first set of the six filter blocks 134 correspond to the terms in the first row of the matrix, with the six terms being multiplied by their corresponding input signals and being summed together at a summer 138 to give the corresponding output signal component, identified in FIG. 6 in the representation of the time domain. It is readily verified by inspection that the second set of six blocks 134 corresponds to the terms of the second row of the matrix, with similar relationships being found between the subsequent sets of six blocks 134 of the filter functions and the subsequent rows of the matrix as is portrayed in FIG. 10.

With reference again to FIG. 5, there are twelve filter blocks 134 of which the first six filter blocks constitute a first set of the filter blocks and wherein the next six filter blocks constitute a second set of the filter blocks. The two sets of six filter blocks 134 have polyphase components of the filter $G(z)$, and may be FIR or IIR (infinite impulse response). The polyphase components are identified as $G_0(z)$ through $G_5(z)$.

The blocks 134 are arranged in groups of two blocks, each group of two blocks being coupled to a summer 138 for combining the signals outputted by the two blocks of the group. Upon inspection of the matrix equation of FIGS. 10 and 11, the arrangement of the filter components in FIG. 5 is obtained by use of the first input signal $X_0(z)$ and the fourth input signal $X_3(Z)$, with the remaining four input signals being zeroed. The filter of FIG. 5 may be employed as a 2-to-6 pulse-shaping filter, by way of example, namely that the pulse-shaping filter converts a two channel input signal set to a six channel output signal set. This provides interpolation by a factor of 3. Each of the filter blocks 134 is a polyphase component of the filter G(z). For the FIR case, the coefficient of the polyphase components (in the time domain) $G_i(n)$ are related to the filter coefficients $\{h_0, h_1, \ldots, h_L\}$ as will be described below.

By way of example in the operation of the filter of FIG. 5 as a pulse shaping filter, input signal of the filter is at the symbol rate, and is interpolated or up-sampled by a factor of preferably 3, which factor provides for proper pulse shaping. Thus, by way of example, if the symbol rate is 200 Msym/s (million symbols per second), the sample rate (after up-sampling by a factor of 3) is 600 Ms/s (million samples per second). With use of the block polyphase (parallel) filter implementation for the pulse-shaping operation, the clock frequency of a digital signal processing device employing the pulse-shaping may be 100 MHz. The rate of the input of the pulse-shaping filter is 2 times 100 which gives 200 Msym/s, and the rate of the output is at 6 times 100 which gives 600 Ms/s.

By way of example in the operation of the filter of FIG. 6, as an equalization filter, and by way of comparison with the foregoing operation of the filter of FIG. 5, the filter of FIG. 6 does not change the sample rate between input and output signal channels. However, assuming that the filter would still be running at the clock frequency of the signal processing device (100 MHz in the foregoing example), the filter is effectively processing 600 Ms/s in view of the six input channels and the six output channels of the filter.

The filter 136 of FIG. 6 is an example of parallel polyphase filter that may be used as an equalization filter for the filtering circuitry 66, 68 of FIGS. 3-4, and does not change the sample rate. In other words, the input to the filter 136 of FIG. 6 is 6 times 100 MHz (or 600 Msps) and the output is also 6 times 100 MHz (or 600 Msps). This filter may have FIR or IIR construction, and can be generalized for M-input, N-output and used generally in a high-speed filtering operation. In digital programmable demodulator circuitry, as shown in FIG. 4, this filtering approach is used to decimate, as shown in FIGS. 7-8, by an integer factor by dropping output lines of the filter.

For examples of decimation, reference is made to the filters of FIGS. 7 and 8. The filter of FIG. 7 employs the same six inputs and as does the filter of FIG. 6, but provides three outputs to accomplish decimation by a factor of 2. The filter of FIG. 8 employs the same six inputs and as does the filter of FIG. 6, but provides two outputs to accomplish decimation by a factor of 3. As mentioned above, with reference to the use of the program memory 84 (FIG. 4) with the components of the demodulator 36, the embodiments of the filters shown in FIGS. 5-8 can be constructed in programmable format by use of an FPGA or a DSP, in which case the interconnections of the various gates and logic elements, as well as implementation of specific values of filter coefficients can be stored in the memory 84. Thereupon, the memory 84 can be addressed as may be desired for implementing various filter functions for processing signals of various modulations and codes.

A mathematical derivation of the implementation of the block polyphase filters, disclosed above, is presented now. A finite impulse response (FIR) filter is described by the difference equation (relating the input to the output)

$$y(n) = \sum_{k=0}^{K-1} h(k)x(n-k) \tag{1}$$

or, equivalently, in the z-domain by $Y(z)=H(z)X(z)$, where $H(z)$ is the system function, namely, the z transform of the impulse response h(n), defined as $$H(z) = \sum_{k=0}^{K-1} h(k)z^{-k} \tag{2}$$

The impulse response of the FIR system is h(n) for n=0, 1, ..., K-1, where x(n) and y(n) are respectively the discrete time input and output samples. The samples at the input and the output are separated by a sample time $T_s=1/f_s$. The delay in the filtering operation uses that same sample, $T_s$. The number representation (namely, fixed point or floating point) of the input samples, output samples, and filter coefficients depends on the application and the required system performance.

Figure 14:
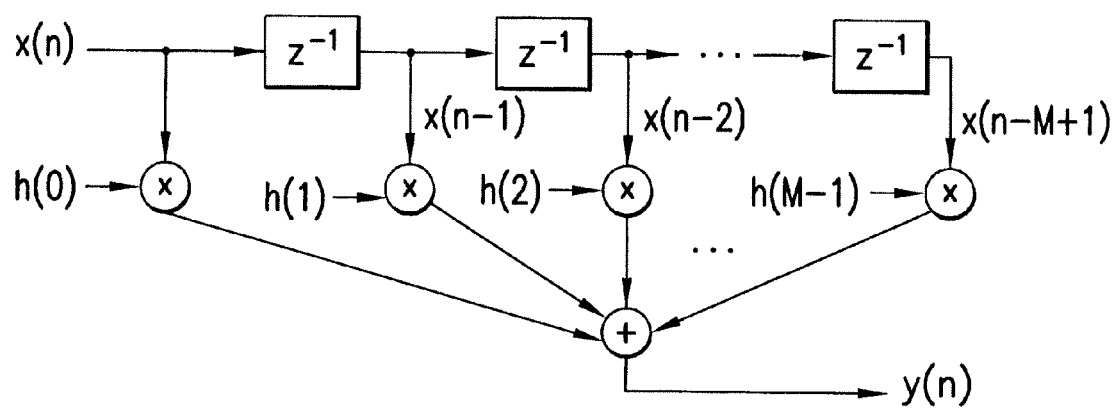
FIGS. 14-18 present diagrams useful in understanding a mathematical derivation of the block polyphase filtering process for operation of the demodulator of the invention.

An FIR system can be implemented in either a direct form, cascade form, frequency sampling, or lattice realization. The system may be realized also by means of the discrete Fourier transform (DFT), possibly based on the fast Fourier transform (FFT) algorithms. That direct-form realization follows immediately from the non-recursive difference equation (1), and is illustrated in FIG. 14. This is used as an illustrative example. Other realizations can be used instead of using equations derived from Equation (1). FIG. 14 shows the direct-form realization of a finite-impulse response (FIR) discrete-time system or filter. The filter coefficients h(n), or equivalently the system transfer function, determine the characteristics of the system, for example, whether the system have a low-pass or high-pass characteristic.

Figure 15:

This is a K-tap FIR filter or system described by the filter coefficients h. Generally, a discrete-time system is illustrated pictorially as shown in FIG. 15. FIG. 15 presents an FIR filter (or system) represented as a block with input and output discrete-time signals. The term FIR implies that the output is generated from the input using Equation (1). In the block of FIG. 15, the legend FIR Filter could be marked as H(z), H(w) where w is radian frequency, or h(n) indicating that the system is described by that particular transfer function or impulse response function. These are all different representations of the same system, and the use of one representation over the other in the block of FIG. 15 does not imply a particular realization (or implementation) technique.

An infinite impulse response (IIR) filter or system is described by the difference equation $$y(n) = \sum_{k=0}^{K-1} b(k)x(n-k) - \sum_{k=1}^{L} a(k)y(n-k) \tag{3}$$

where the system function namely, the z transform of the impulse response h(n), is defined as $$H(z) = \frac{\sum_{k=0}^{K-1} b(k)z^{-k}}{1 + \sum_{k=1}^{L} a(k)z^{-k}} \quad (4)$$

The system is described by the system function H(z) or by the time-domain taps, a(k) and b(k). Just as in the case of the FIR system, there are several types of structures or realizations, including direct-form structures, cascade-form structures, lattice structures, and lattice-ladder structures. As shown in Equation (4), the filter coefficients b(k) for k=0, 1, . . . , K−1, define the zeros in the system and the filter coefficients a(k) for k=0, 1, . . . , L, define the poles (feedback) in the system.

With respect to an IIR system, the term IIR implies that the output is generated from the input. This may be part of a larger system implying that the output, is related to the input by Equation (3) without indicating the particular time realization (or implementation) approach.

Figure 16:
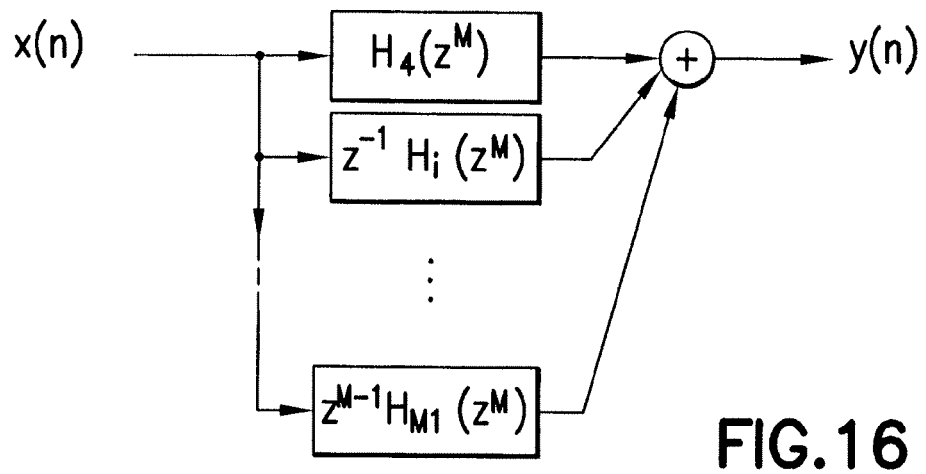
Figure 17:
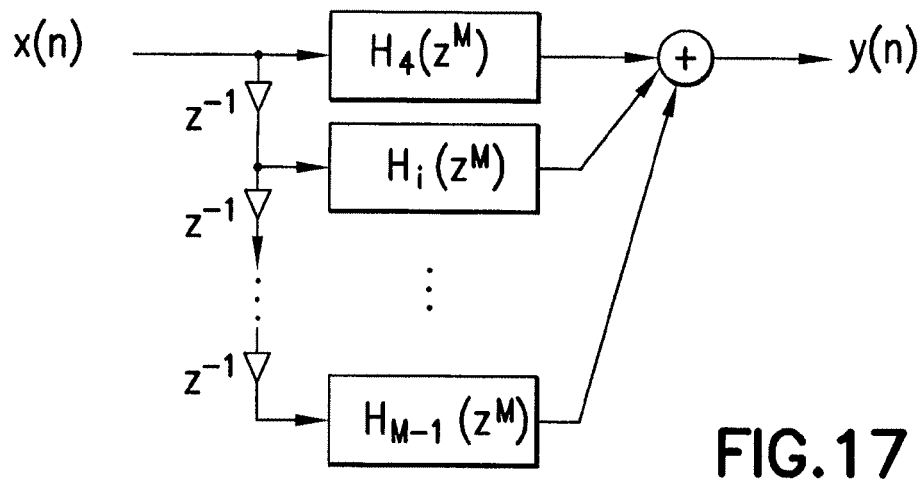

The polyphase filter realization is obtained as follows. An FIR or IIR system can be implemented or realized using the polyphase components. That is, a filter or system can be expanded as the sum of sub-filters known as polyphase components. This expansion is useful in decimation and interpolation operations. For the case of an FIR system, Equation (2) can be expanded as follows:

$$H(z) = \sum_{n=0}^{\infty} h(n)z^{-n} \quad (5)$$

$$= \sum_{n=0}^{\infty} [h(Mn)z^{-Mn} + h(Mn+1)z^{-(Mn+1)} + \Lambda +$$

$$+ h(Mn+M-1)z^{-(Mn+M-1)}]$$

$$= \sum_{n=0}^{\infty} h(Mn)z^{-Mn} + \sum_{n=0}^{\infty} h(Mn+1)z^{-(Mn+1)} + \Lambda +$$

$$\sum_{n=0}^{\infty} h(Mn+M-1)z^{-(Mn+M-1)}$$

$$= z^{-0} \sum_{n=0}^{\infty} h(Mn)z^{-Mn} + z^{-1} \sum_{n=0}^{\infty} h(Mn+1)z^{-Mn} + \Lambda +$$

$$z^{-M+1} \sum_{n=0}^{\infty} h(Mn+M-1)z^{-Mn}$$

$$= z^{-0} H_0(z^M) + z^{-1} H_1(z^M) + \Lambda + z^{-M+1} H_{M-1}(z^M),$$

or $$H(z) = \sum_{i=0}^{M-1} z^{-i} H_i(z^M) \quad (6)$$

Where $H_i(z)$ are the polyphase components of the filter H(z). The FIR filtering operation using the expansion of Equation (6) is represented in the block diagram shown in FIGS. 16 and 17. A combining of the input-output relationship of Equation (1) in the z-domain with Equation (6) produces $$Y(z) = H(z)X(z) \quad (7)$$

$$= \sum_{i=0}^{M-1} z^{-i} H_1(z^M) X(z) \text{ or}$$

$$Y(z) = \sum_{i=0}^{M-1} H_1(z^M)[z^{-i} X(z)], \quad (8)$$

in which the delays are combined with the input signal instead of the filter components as shown in FIGS. 16 and 17. The embodiments of FIGS. 16 and 17 are equivalent and their block diagrams show the polyphase realizations of FIR systems using M filter components. The filtering operation is represented as the sum of M filter components each having K/M non-zero coefficients separated by M−1 zeros. For simplicity, it may be assumed that K is an integer multiple of M (h can be padded with zeros if K is not an integer multiple of M).

Each of the blocks of FIGS. 16 and 17 represent a filter or system that is defined by the difference equation presented in Equations (1) and (2), and can be realized in any structure as discussed above. The order (or number of taps) of each of the polyphase sub-filters is K/M where K is the number of taps in the original filter h(n) and M is the expansion factor.

The filter components, $H_i(z^M)$, introduced in Equation (6) and shown in FIGS. 16 and 17, are defined by the z-transform as follows:

$H_0(z^M) \Leftrightarrow \{h(0) \; 0 \; \Lambda \; 0 \; h(M) \; 0 \; \Lambda \; 0 \; h(2M) \; 0 \; \Lambda\}$ $H_1(z^M) \Leftrightarrow \{h(1) \; 0 \; \Lambda \; 0 \; h(M+1) \; 0 \; \Lambda \; 0 \; h(2M+1) \; 0 \; \Lambda\}$

M M M $H_{M-1}(z^M) \Leftrightarrow \{h(M-1) \; 0 \; \Lambda \; 0 \; h(2M-1) \; 0 \; \Lambda \; 0 \; h(3M-1) \; 0 \; \Lambda\}$ (9)

Where h(n) are the FIR filter coefficients. $H_i(z)$ for I=0, 1, . . . , M−1 are the polyphase components and are related to the time domain filter coefficients h(n) for n=0, 1, . . . , M−1 by $h_i(n)=h(Mn+i)$ or, explicitly stated, by $H_0(z) \Leftrightarrow h_0 = \{h(0) \; h(M) \; h(2M) \; \Lambda\}$ $H_1(z) \Leftrightarrow h_1 = \{h(1) \; h(M+1) \; (2M+1) \; \Lambda\}$

M M M $H_{M-1}(z) \Leftrightarrow h_{M-1} = \{h(M-1) \; h(2M-1) \; h(3M-1) \; \Lambda\}$ (10)

It is noted that the filter components shown in Equation (9) are an interpolated version (by interpolation factor of M) of the polyphase filter components presented in Equation (10). The non-zero coefficients in Equation (9) are separated by M−1 zeros, which are identified in the z-domain by the expression $z^M$ instead of z.

Figure 18:

In the process of decimation, in a sequence of samples outputted by a filter, some of the samples may be deleted (down-sampling). There is no loss of information in the decimation process if the signal is band-limited, and the resulting sample rate, after the decimation, satisfies the Shannon sampling theorem, wherein the sampling rate must be higher than twice the maximum frequency content of the signal. These operations are generally illustrated in a diagram as shown in FIG. 18, wherein the filtering (independent of the method of implementation of the decimation) is running at the sample rate with sample time of $T_s=1/f_s$ although samples are discarded by the down-sampling operation and are not needed.

The operation denoted by the down arrow and letter D is the operation of down-sampling or reducing the sampling rate by a factor of D. For example, if the sample time for x(n) and y(n) is $T_s=1/f_s$, then the sample time for z(n) is $D \times T_s=1/(f_s/D)$. This operation is a taking of one sample out of D samples as defined by the following equation:

$$y'(m)=y(Dm)$$

As an example, let y(n)={0.1, 0.2, 0.3, 0.4, 0.5, 0.6} for n=0, 1, 2, 3, 4, 5, and let D=2, then y'(m)={0.1, 0.3, 0.5}; for m=0, 1, 2, since y'(m)=y(2m) for all m=−0, 1, 2, (or y'(0)=y(0), y'(1)=y(2), and y'(2)=y(4)). These samples and their indices do not in the show the sample rate (namely, time step between samples), but it is understood that if the samples in y are separated by $T_s$, the samples in y' are separated by $2T_s$. The filtering process (independently of the filter realization) is processing input samples at the high sample rate of $1/T_s$ although samples are discarded by the down-sampling operation that immediately follows the filtering. Such wasteful processing is recovered by use of the polyphase filter realization.

Digital Down-Conversion and Carrier NCO

Figure 19:
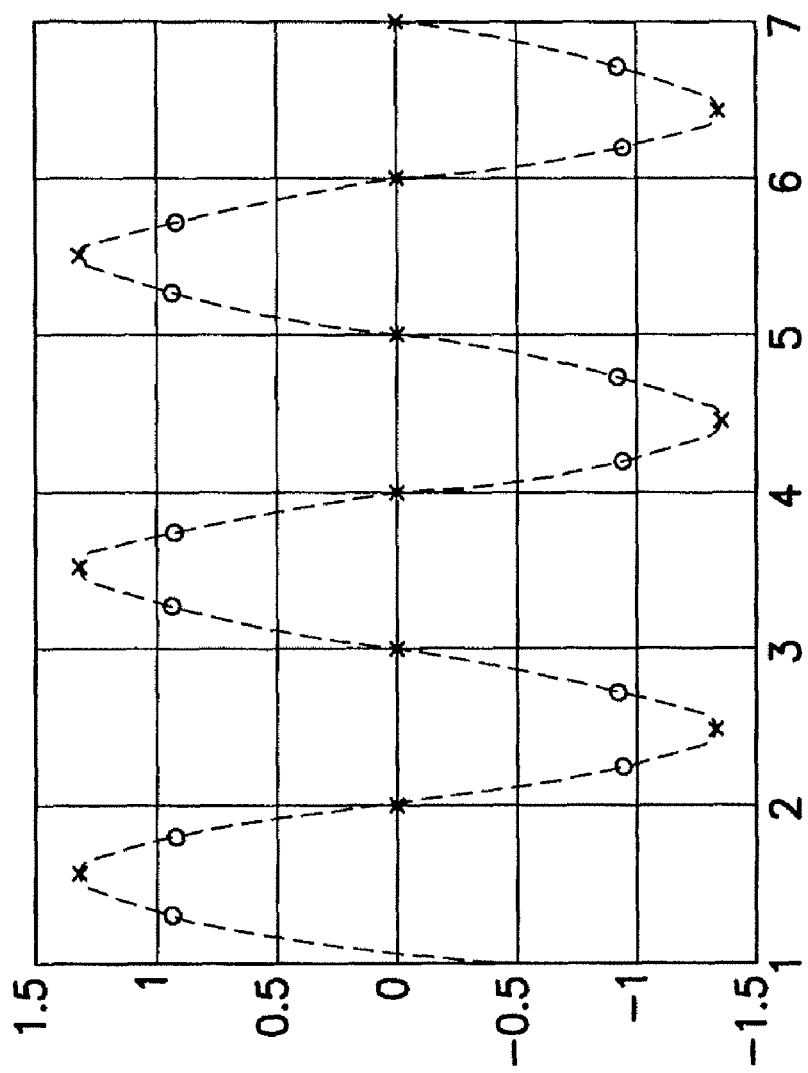
FIGS. 19-20 are graphical representations of the sampling of a waveform, and show the demultiplexing of a digital input signal into two phases (or channels), useful in explaining the down-conversion process and generation of reference frequencies in the operation of the demodulator.
Figure 20:
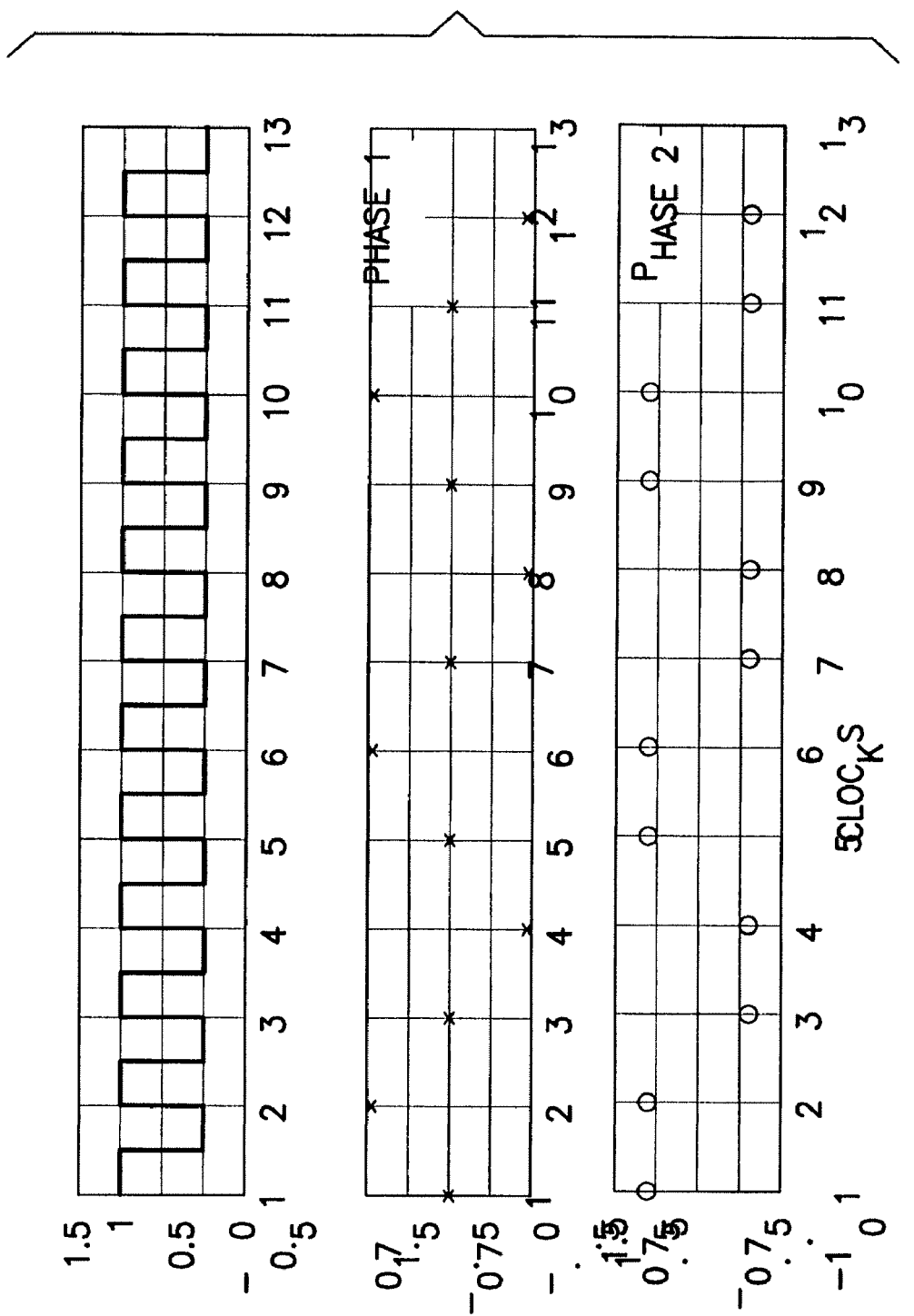

FIGS. 19-20 present graphs of a signal processing operation, useful in understanding the digital down-conversion and operation of the carrier NCO. Samples of a signal are shown being processed through a 2-phase (2-channel) demodulator. These results are not specific to any block of the demodulator 36 described above, but can be thought of as the input to the demodulator 36. Filtered (pulse-shaped) symbols for BPSK modulation with a pattern of 1, 0, 1, 0, 1, 0, are shown in the graph of FIG. 19. In this example, each symbol is represented by 4 samples; thus the sample rate is 4 times the symbol rate. The samples (indicated by x-o points) are displayed on top of the symbol pattern shown in dashed line. The demodulator signal processing operates on x-o samples at the sample rate (or 4 times the symbol rate). If one assumes a 2-phase parallel demodulator with an FPGA clock rate of 125 MHz, the processing rate is 250 Msps (2 samples per clock in a 2-phase or 2-channel demodulator), and the symbol rate is 250/4 or 67.5 Msymbols/second (4 samples per symbol). The following graphical representation, in FIG. 20, is a set of three graphs showing a clock waveform in the first graph, and presenting the de-multiplexing of the samples of the signal onto the two processing channels, shown as phase 1 and phase 2 in the second and the third graphs.

Figure 21:
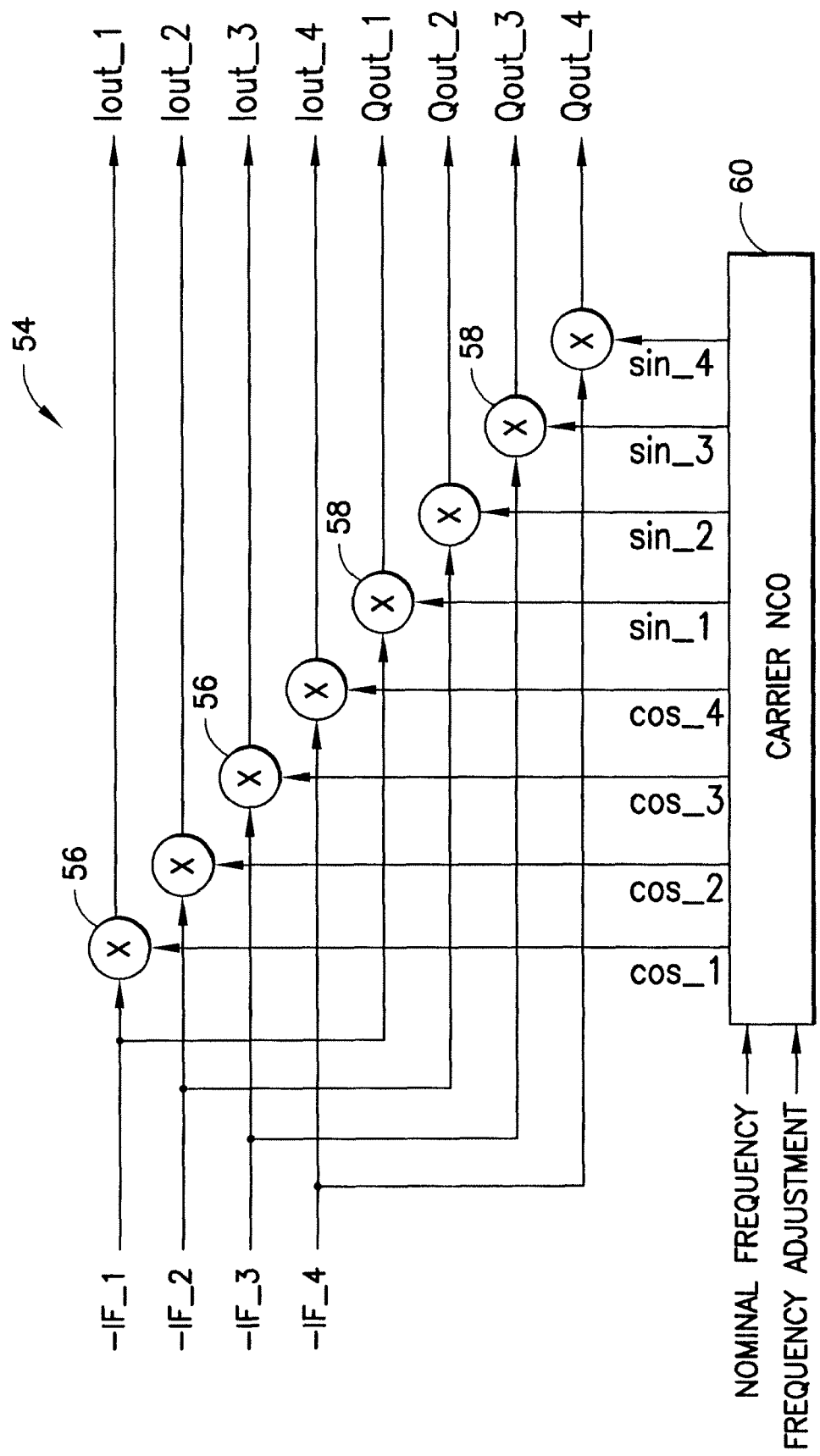
FIG. 21 shows diagrammatically components of down-conversion circuitry implemented by parallel-channel (4 channels) construction.

FIG. 21 shows further detail in the construction of the digital down-conversion circuitry 54, previously described with reference to FIGS. 3 and 4. In particular, FIG. 21 shows individual ones of the multipliers 56 and 58, and identifies the reference signals applied to respective ones of the multipliers 56, 58 by the carrier NCO 60. Digital down-conversion is achieved by multiplying the input real signal with a cosine reference signal and sine reference signal. The multiply by the cosine function produces the in-phase (I) component, and the multiply by the sine function produces the quadrature (Q) component. This is in a sense digital mixing of the input signal, wherein the input signal is assumed real and has a center frequency of $f_{IF}$. The sine and cosine references are samples generated by the carrier NCO 60 in digital format. This is shown in the figure for a 4-phase (or 4-channel) parallel case in which the input signal is denoted IF_1, IF_2, IF_3, and IF_4 and the output (I and Q) signals are denoted Iout_1, Iout_2, Iout_3, Iout_4, Qout_1, Qout_2, Qout_3, and Qout_4.

Figure 22:
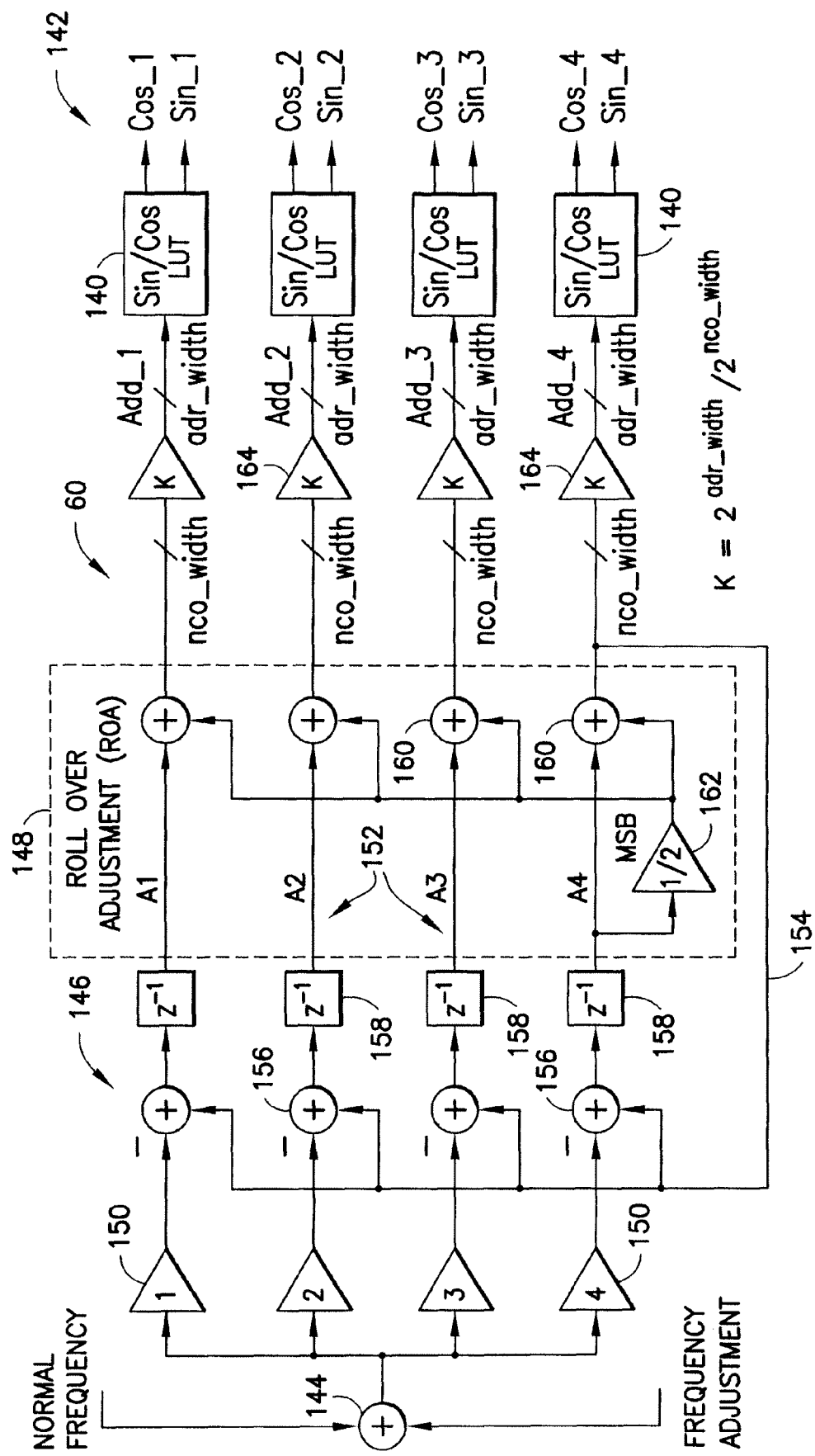
FIG. 22 shows diagrammatically components of a carrier numerically controlled oscillator implemented by parallel-channel (4 channels) construction.

FIG. 22 shows further detail in the construction of the carrier NCO 60, previously described with reference to FIGS. 3 and 4. The NCO 60 receives two input control signals, shown at the left of the figure, namely, a signal designating a nominal value of the frequency outputted by the NCO 60, and a signal designating a frequency adjustment. On the right side of the figure are shown the reference signals, previously identified in FIG. 21, which are outputted to the multipliers 56, 58 of the down-conversion circuitry 54. The NCO 60 includes sin/cos look-up tables (LUT) 140 (or alternatively, the sine/cosine functions can be generated using parallel CORDICs phased appropriately) which output the reference signals at 142.

The Nominal Frequency is the input command into the carrier (NCO) 60, and it is equal to $f_{IF} \times 2^{nco\_width}/f_s$, where $f_{IF}$ is the center frequency of the input signal, nco_width is the number of bits in the NCO register and $f_s$ is the sampling rate. The second input to the NCO 60, which is added to the Nominal Frequency at summer 144, is the Frequency Adjust command, which is the feedback error outputted by the carrier loop filter 102 (shown in FIG. 4). Therefore, the NCO 60 can also provide phase error correction, which correction can be disabled by setting the Frequency Adjust to 0.

The carrier NCO 60 includes an accumulator section 146 that feeds into a roll-over adjustment section 148. The output of the accumulator and roll-over adjustment, provided by the sections 146 and 148, is scaled to match the format expected for addressing the sin/cos LUT 140. The carrier NCO 60 can be used in conjunction with the digital down conversion 54 to down convert a signal from IF to baseband and to correct for carrier phase error fed into the carrier NCO 60 via the Frequency Adjust command.

In the accumulator section 146, the sum of the frequency commands, as outputted by the summer 144, is applied via scale factor elements 150 to respective ones of parallel channels 152, four of the channels 152 being shown by way of example in this embodiment of the invention. A feedback signal 154 from one of the channels 152, the fourth channel for the MSB (most significant bit) in the roll-over section 148, is summed to the scaled frequency commands by summers 156 in respective ones of the channels 152, the summing being accomplished with a negative input from the scale factor elements 150. Output signals of the summers 156 in the respective channels 152 are applied via delay elements 158 (providing a delay of one clock period) to further summers 160 in the roll-over section 148. A portion of the MSB signal is drawn off by scale-factor element 162 and combined with the signals in the respective channels via the further summers 160 to provide the roll-over adjustment signal. The presence of the delay elements 158 along with the feedback signal 154 enable the signals from the summers 156 to increase in a ramp fashion. Registers in the summers 160 of the roll-over section 148 dump excess bits when the maximum value of the summer is reached, this establishing an upper bound of the NCO register width. Also, scaling elements 164 provide a further limit on the magnitude of signals output by the roll-over section 148 so as to avoid exceeding the address width of the LUTs 140.

By way of alternative embodiment, the carrier NCO 60 can be used also with a digital phase shift block to correct for carrier phase and frequency errors. In this case, the input signal would be at baseband (complex signal with I and Q components) and the digital down-conversion block would be replaced by a digital phase shift block. The digital phase shift is similar to the digital down conversion except that its input is at baseband instead of real input at IF. The input baseband signal is a complex signal consisting of I and Q components. The digital phase shift block performs a complex multiply of the input signal with the sin and cos samples generated by the carrier NCO. That is the output of the digital phase shift is computed as Iout=I×cos−Q×sin and Qout=I×sin+Q×cos. This operation is performed in parallel. If I and Q at the input are de-multiplexed into 4 each, then the NCO must generate 4 sin and 4 cos samples per clock and perform the following operations at each clock:
Iout_1=I_1×cos_1−Q_1×sin_1;
Qout_1=I_1×sin_1+Q_1×cos_1
Iout_2=I_2×cos_2−Q_2×sin_2;
Qout_2=I_2×sin_2+Q_2×cos_2
Iout_3=I_3×cos_3−Q_3×sin_3;
Qout_3=I_3×sin_3+Q_3×cos_3
Iout_4=I_4×cos_4−Q_4×sin_4;
Qout_4=I_4×sin_4+Q_4×cos_4

Figure 23:
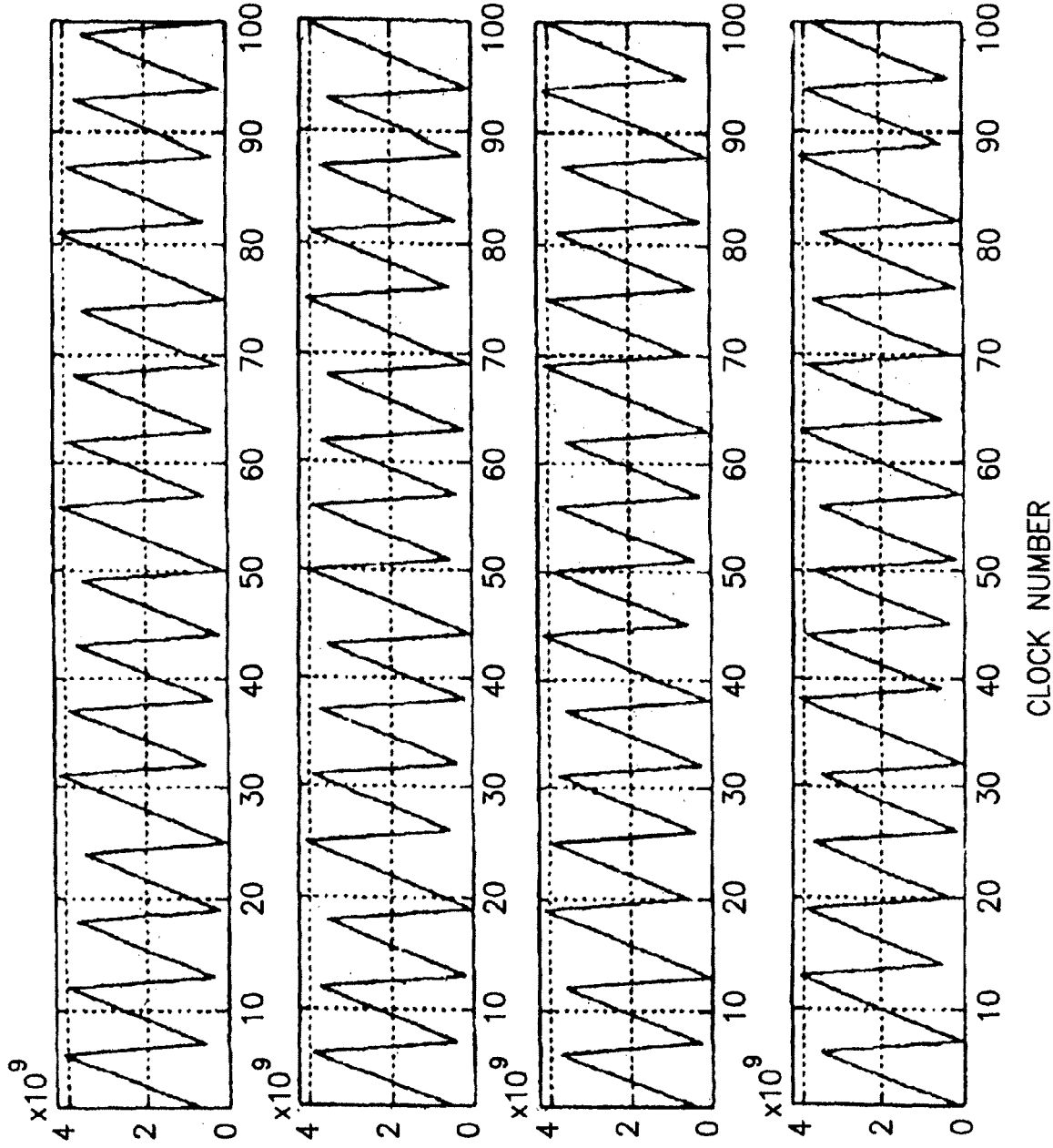
FIGS. 23-27 present graphs of waveforms useful in explaining operation of the carrier numerically controlled oscillator of FIG. 22.

As an example, and with reference to the graphs of FIGS. 23-27, let the sample rate, $f_s$, be 500 Msps, the clock rate be 125 MHz (or ¼ $f_s$), and the input command frequency, $f_{IF}$, be 20 MHz. The set of graphs displayed in FIG. 23 show the four signals at the output of the roll-over adjustment. The plots show the individual signals for multiple cycles or a total of 100 clocks (at the clock rate of 125 MHz). This shows that the four signals ramp up to the maximum value that can be represented by the NCO register (which is of width nco_width of 32 in this example), then roll-over or wrap around near zero and ramp up again. The four signals ramp up at the same rate, however, they do have a phase offset relative to one another. This can be observed in the compressed graph of FIG. 24 that displays the signals on one graph showing the difference between the four outputs for a few clock periods only.

Figure 24:
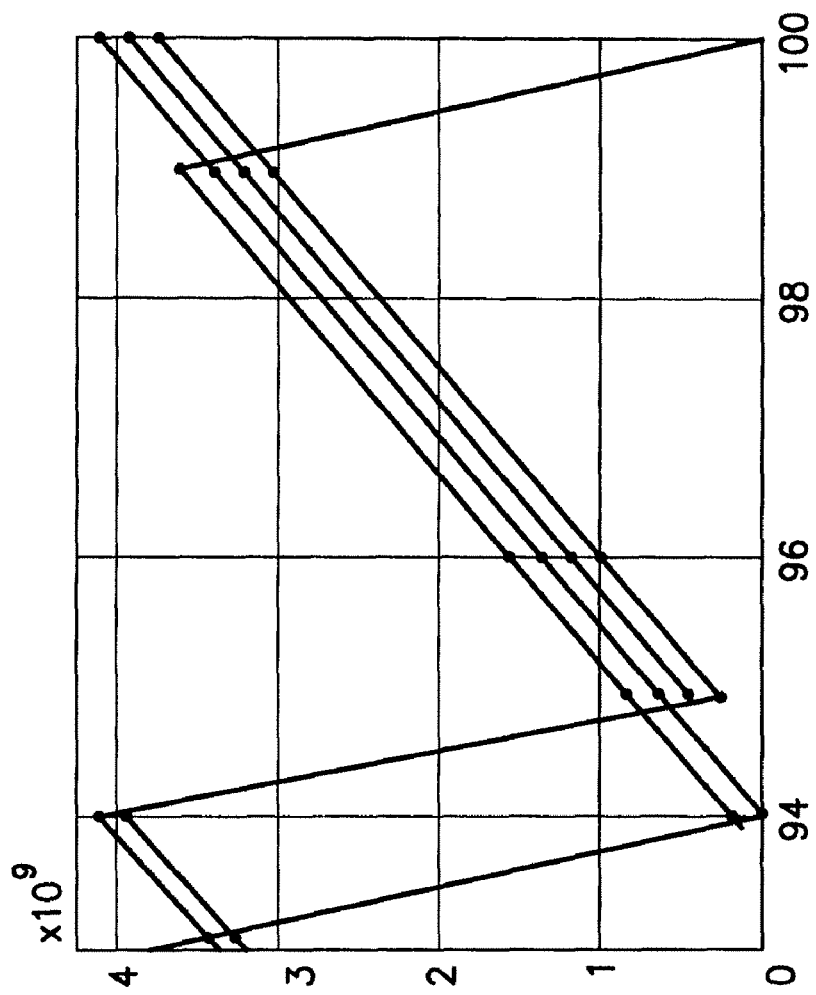
Figure 25:
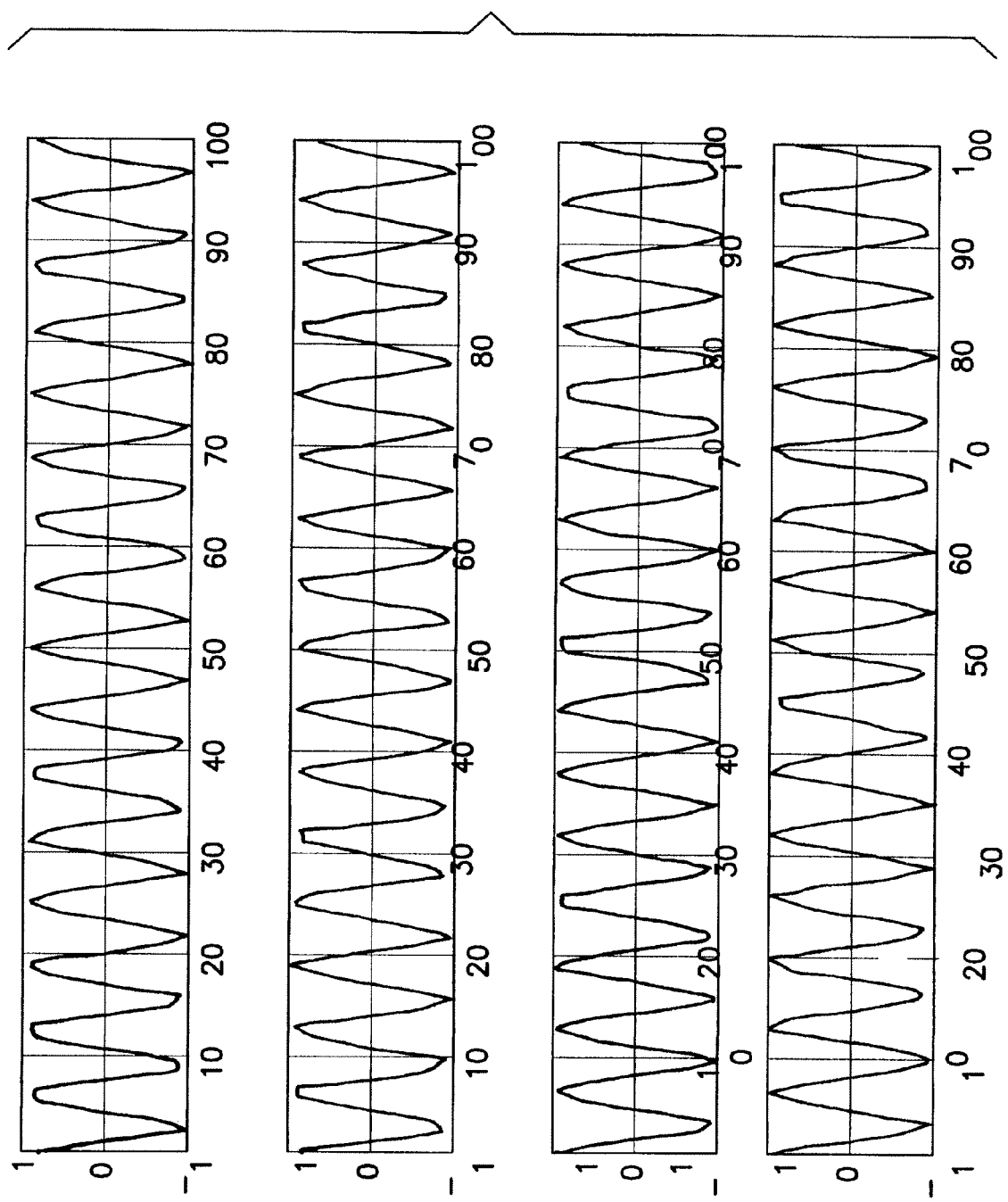
Figure 26:
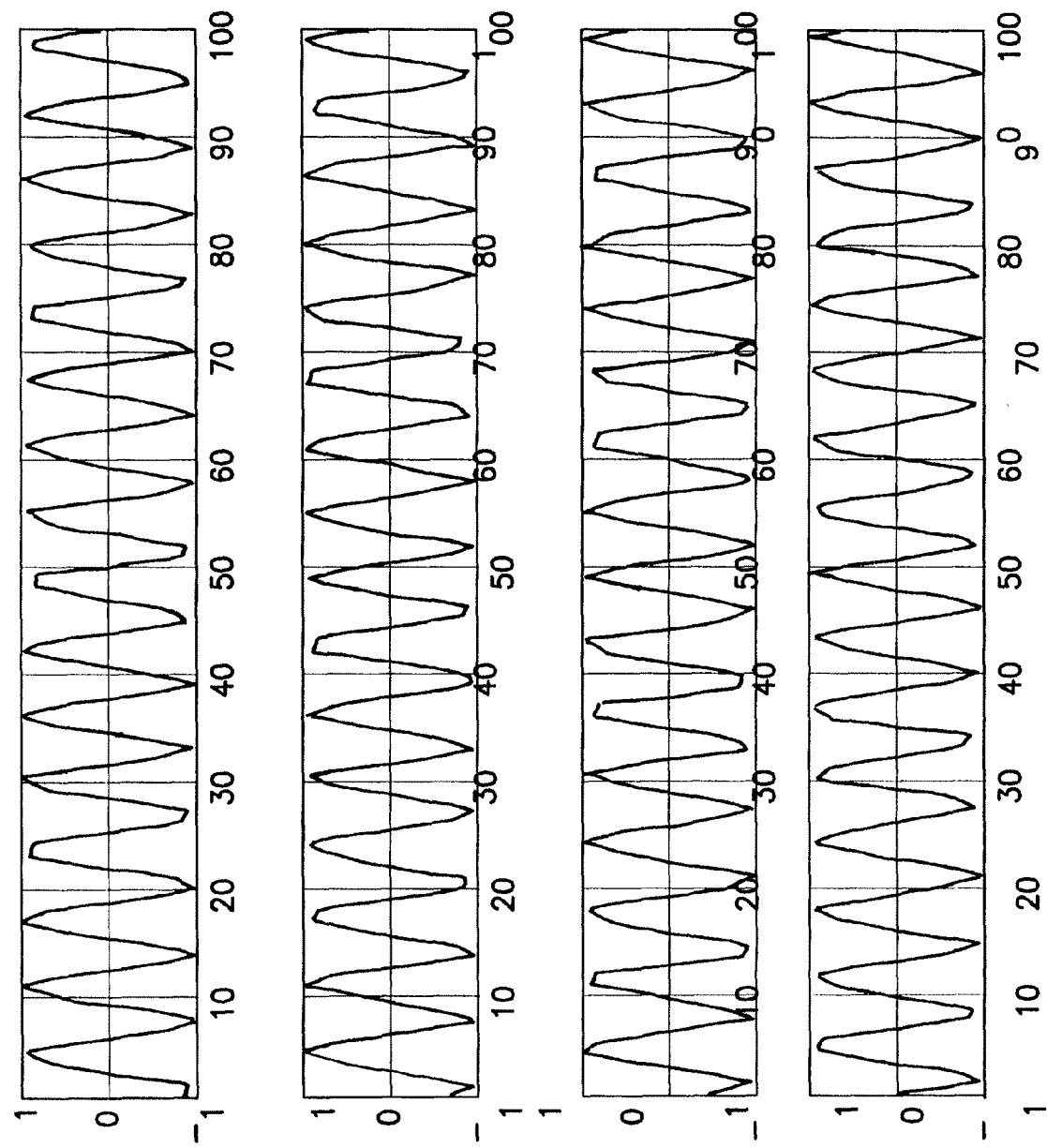
Figure 27:
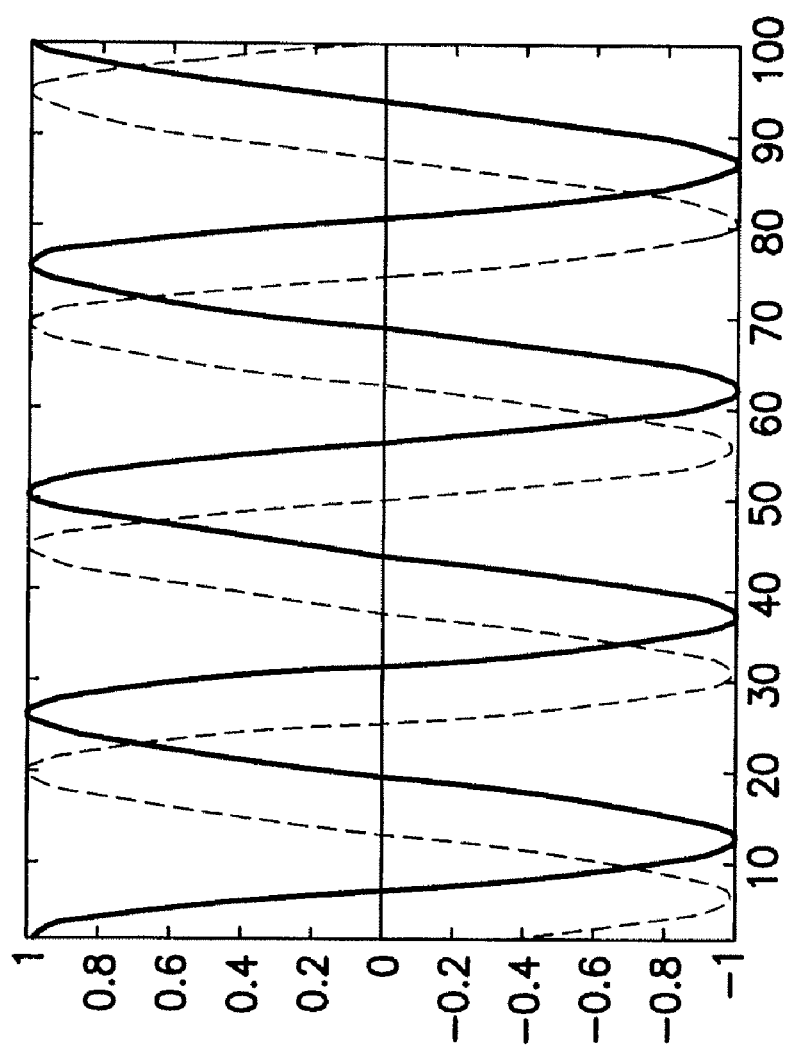

The signals shown in FIGS. 23-24 are scaled (converted to addresses in the range 0 to table_length−1). In this example, a LUT 140 has 512 elements (or an adr_width of 9 bits). FIG. 25 shows the individual outputs of the cosine look-up table for multiple cycles and FIG. 26 shows individual outputs of the sine look-up table for multiple cycles. FIG. 27 shows the sine function (dashed line), and cosine function (solid line) when merging (or multiplexing) the 4-phase NCO outputs of FIGS. 25-26. In the actual design the samples remain de-multiplexed or in parallel and are used to multiply the IF or baseband input signal. This particular example shows an NCO that is clocked at 125 MHz but generates sin/cos samples at 500 Msps (or 4 sine and 4 cosine samples per clock period at the 125 MHz clock).

Fractional Delay Filter and Timing NCO

Figure 28:
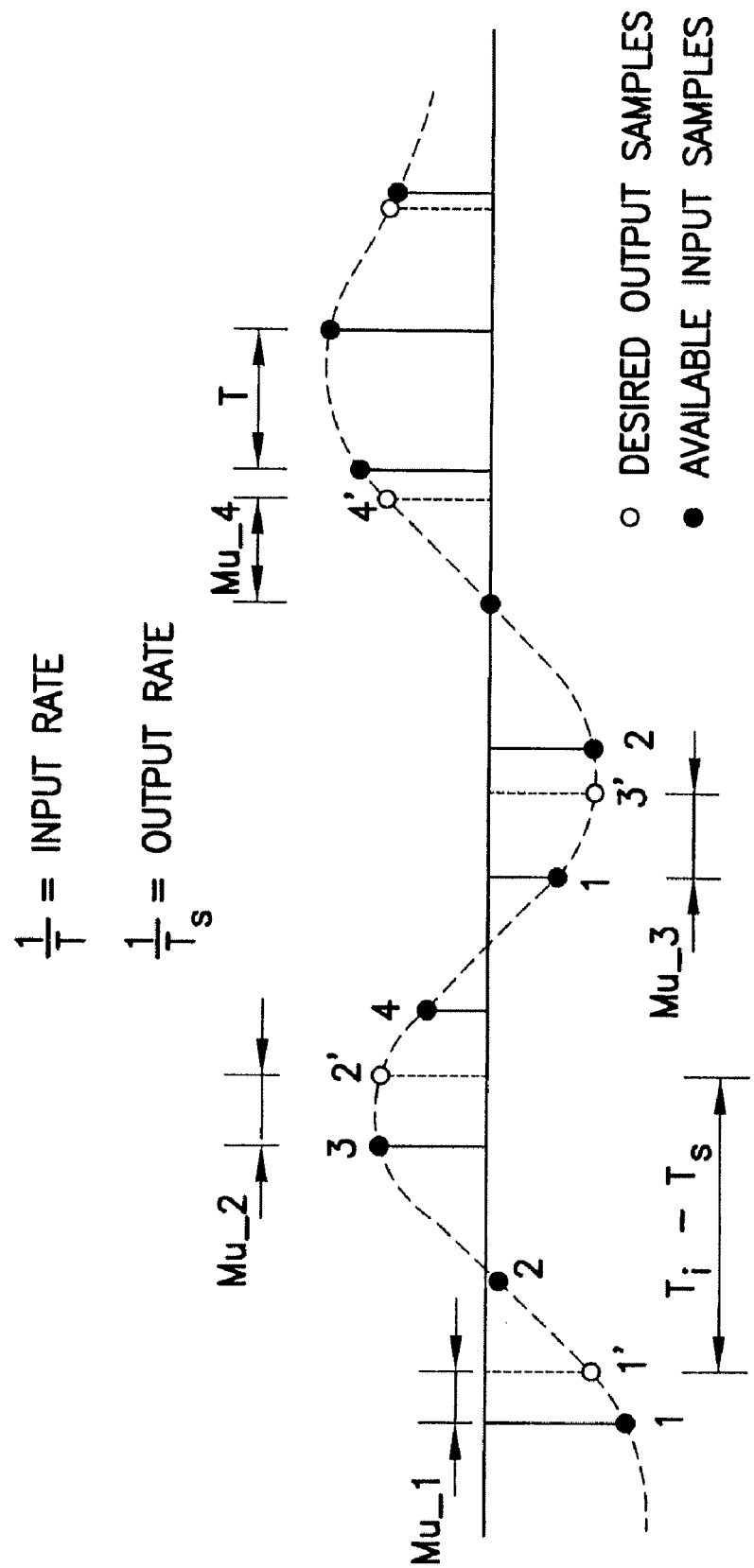
FIG. 28 is a graph of signals useful in explaining operation of fractional delay interpolation circuitry.

FIG. 28 provides an example of the input and output samples of the parallel fractional interpolation circuitry 70, 72 of FIGS. 3-4 that also can provide the functions of a fractional decimation filter or fractional delay filter. Also shown in FIG. 28 are time offsets, Mu, which time offsets are shown also in FIG. 4 to serve as commands from the timing NCO 74 to the circuitry 70, 72 for implementing a delay which is only a fraction of a sample. Accordingly, it is useful to study FIG. 28 for facilitating a description of the timing NCO 74 and the fractional-delay interpolation circuitry 70, 72.

In FIG. 28, the input and output samples of a signal applied to the fractional-delay interpolation circuitry 70, 72 are shown serially in time and interleaved on the same time-axis. 1, 2, 3, 4 are the input channel numbers, and 1', 2', 3', 4' are the output channel numbers for a 4-input, 4-output fractional decimation example. Thus, all the samples marked with 1 are input to one channel (or phase) and all the samples marked 1' are output from the one channel (or phase) and so on. Associated with each output channel or phase is a fractional value, Mu, equal to the temporal distance away from the input samples. That is, Mu_1 is the distance from the location of the desired sample position 1' to the nearest available input sample, in this case, 1; and Mu_2 is the distance from the location of the desired output location 2' to the nearest available sample, in this case, 3.

For a linear interpolation, the sample at desired position 1' is generated using the available samples 1 and 2 and the factor Mu_1 (which is associated with channel 1). The sample at desired position 2' is generated using the available samples 3 and 4 and the factor Mu_2 (associated with channel 2), and so on. It is noted that generating a desired output at any channel i' may require input samples from more than one channel. For example, generating the output 1' requires the input samples 1 and 2 which are present at the input channels 1 and 2. Due to this interleaving of samples, buffering is required at the input of the parallel Farrow structure. This buffering is shown in the block diagrams accompanying the ensuing description. The timing NCO serves as a counter that generates the fractional values Mu_1, Mu_2, Mu_3 and Mu_4. As noted above, the foregoing description applies for a linear interpolation. Alternatively, for a higher order interpolation, more samples are employed. For example, with reference to FIG. 28, in the generation of the desired output sample 2', use would be made of the available input samples 1', 2' and 3' (preceding the output sample 2'), and the available input sample 4 (following the output sample 2').

The Farrow structure is employed in the construction of the fractional-delay interpolation circuitry 70, 72 because it is a relatively simple and efficient way of implementing an interpolation function. The Farrow structure can either be a linear, piece-wise parabolic, cubic, or other form of interpolator. The Farrow structure has been used in the literature to perform decimation (or re-sampling) with a fractional factor. By way of example, Farrow structures are shown in L. Erup, F. M. Gardner, and R. A. Harris, "Interpolation in Digital Modems—Part II: Implementation and Performance", IEEE Transactions on Communications, Vol. 41, No. 6, June 1993, at pages 1001-1002 (hereinafter referred to as "Erup"). It is noted that the teachings of the Farrow structure in the existing literature are limited to a non-parallel single channel case. In this invention, the Farrow structure is implemented in parallel so as to achieve higher processing rates using low FPGA clock speeds (e.g. processing rate of 500 Msps using a 4-phase design running at 125 MHz). Other realizations for fractional decimation can also be used. The Farrow structure is the preferred method for its simplicity.

For example, assume that the sample rate at the input of the Farrow structure is 500 Msps. To decimate to 100 Msps requires decimation by the integer factor of 5, which simply means picking one sample, say the first, out of every five samples. However, to decimate down to 200 Msps from 500 Msps implies that one has to decimate by the non-integer factor of 2.5. This requires generation of samples that are not available in the input sample stream. Such extra samples are generated by interpolation of adjacent samples. The number of samples used in the interpolation depends on the interpolation order. For example, a linear interpolator uses the adjacent samples next to the position of the required output sample.

Figure 29:
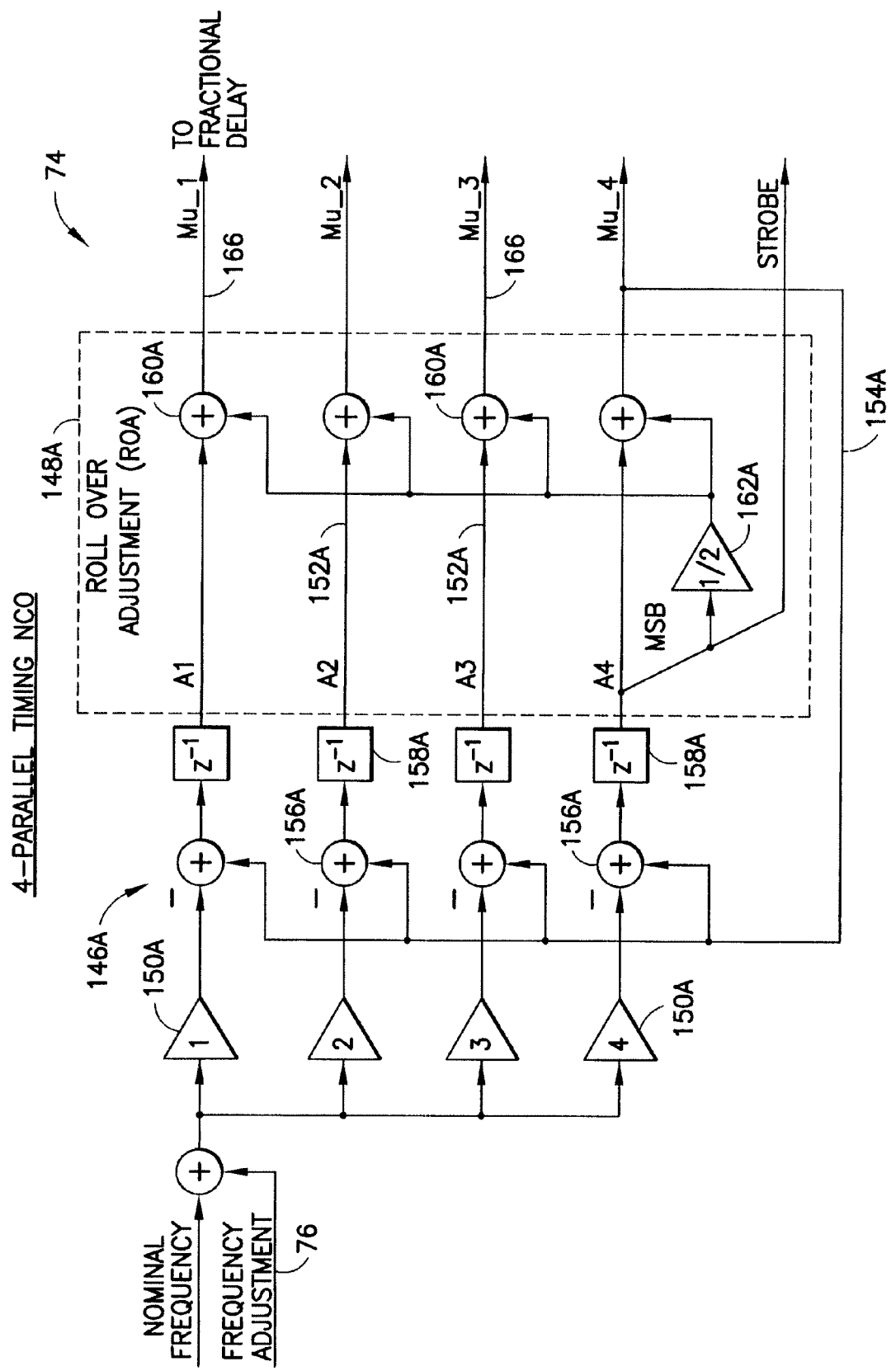
FIG. 29 shows diagrammatically components of a timing numerically controlled oscillator.

With reference to FIG. 29, the circuitry of the timing NCO 74 resembles a portion of the carrier NCO 60 described above with reference to FIG. 22, and operates in similar fashion. To facilitate a description of the timing NCO 74, the same reference numerals, except for the inclusion of the letter "A", as are employed in FIG. 22 are employed also in FIG. 29 for corresponding components.

In FIG. 29, the NCO 74 receives two input control signals, shown at the left of the figure, namely, a signal designating a nominal value of the frequency of timing signals outputted by the NCO 74, and a signal designating a frequency adjustment for timing error correction provided on line 76 by the error detection and filtering circuitry 100. The frequency adjustment signal is added to the nominal frequency at a summer 144A. On the right side of the figure are shown the time reference signals 166, previously described with reference to FIG. 4, which are outputted to the fractional-delay interpolation circuitry 70, 72, as described above with reference to FIG. 4.

The timing NCO 74 includes an accumulator section 146A that feeds into a roll-over adjustment section 148A. The output of the accumulator and roll-over adjustment, provided by the sections 146A and 148A, is scaled to provide a desired range of timing correction signals. In the accumulator section 146A, the sum of the frequency commands, as outputted by the summer 144A, is applied via scale factor elements 150A to respective ones of parallel channels 152A, four of the channels 152A being shown by way of example in this embodiment of the invention. A feedback signal 154A from one of the channels 152A, the fourth channel for the MSB in the roll-over section 148A, is summed to the scaled frequency commands by summers 156A in respective ones of the channels 152A, the summing being accomplished with a negative input from the scale factor elements 150A.

Output signals of the summers 156A in the respective channels 152A are applied via delay elements 158A to further summers 160A in the roll-over section 148A. A portion of the MSB signal is drawn off by scale-factor element 162A and combined with the signals in the respective channels via the further summers 160A to provide the roll-over adjustment signal. The presence of the delay elements 158A along with the feedback signal 154A enable the signals from the summers 156A to increase, in a ramp fashion. Registers in the summers 160A of the roll-over section 148A dump excess bits when the maximum value of the summer is reached, this establishing an upper bound of the NCO register width.

Figure 30:
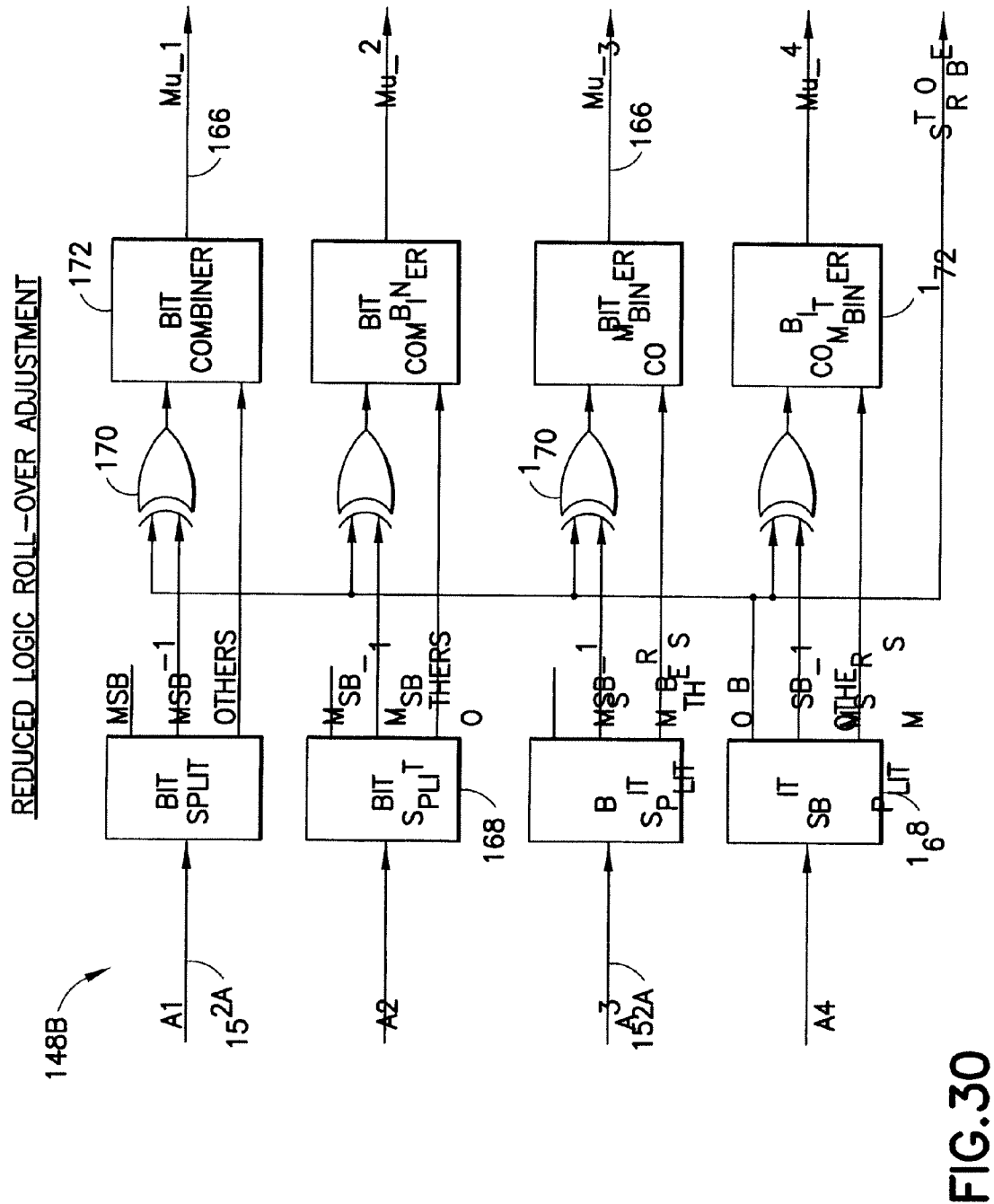
FIG. 30 shows diagrammatically components of a roll-over portion of the timing numerically controlled oscillator of FIG. 29.

In FIG. 30 there is shown a form of roll-over adjustment circuitry 148B for use in providing the function of the roll-over circuitry 148A of FIG. 29. Comparison of the two circuits shows the channels 152A at the left side of the figure, and shows the time reference signals 166 outputted at the right side of the figure. For each of the channels 152A there are provided a bit splitter 168, an exclusive-OR gate 170, and a bit combiner 172. In each of the channels 152, the bit splitter 168 separates the most significant-bit and the next most significant bit from the other bits of the digital signal. The next-most significant bit is applied to the gate 170 in its respective channel, along with the most significant bit of the fourth channel to produce the gate output signal. In each of the channels, the gate output signal is combined, by the respective bit combiner 172, with the remaining bits of the bit splitter 168 to provide the respective time reference signal 166.

Figure 31B:
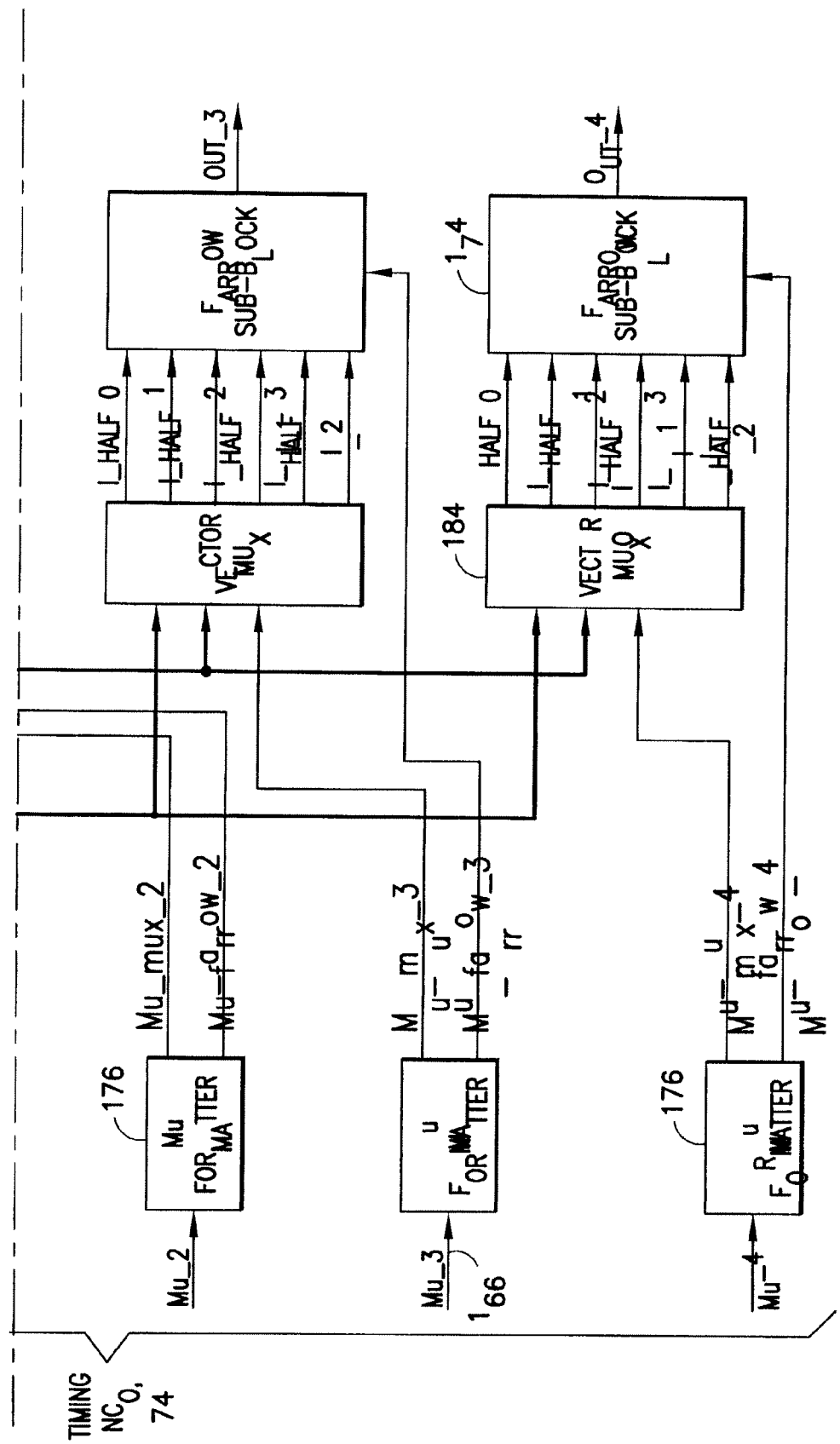
FIGS. 31 (FIG. 31A and FIG. 31B) through FIG.33 show diagrammatically components of a Farrow structure in the fractional delay interpolation circuitry.

FIG. 31 shows the Farrow construction of the fractional-delay interpolation circuitry 70, 72. At the lower left portion of the figure, there are shown the time reference signals 166 provided by the timing NCO 74 and described previously with reference to FIGS. 3, 4, 29 and 30. In the upper left portion of the figure are shown signals associated with the filter 88, described with reference to FIG. 4. On the right side of the figure are shown signals outputted to the filtering circuitry 66, 68, and referred to above with reference to FIG. 4. The output signals are shown provided in four channels, each channel having a Farrow sub-block 174, to be described with reference to FIG. 32. The signals inputted from the timing NCO 74 are processed respectively in separate channels, wherein the signal in each channel is processed by a Mu Formatter 176, to be described with reference to FIG. 33.

In FIG. 31, signal samples and a strobe signal from the filter 88 are applied to parallel-input shift registers 178 and 180, wherein the signal samples are applied directly to the first of the shift registers 178 and are applied via scalers 182 to the second of the shift registers 180. The scalers introduce a scale factor of ½. Signals outputted by each of the shift registers 178, 180 are applied to the four Farrow sub-blocks 174 via a corresponding set of four vector multiplexers 184. The first of the multiplexers 184 is operated with a Mu coefficient supplied by the first of the formatters 176, with the second, the third and the fourth of the multiplexers 184 being operated respectively with Mu coefficients supplied by the second, the third and the fourth of the formatters 176, as indicated in the figure. In similar fashion, the first, the second, the third and the fourth of the formatters 176 provide Mu coefficients respectively to the first, the second, the third and the fourth of the Farrow sub-blocks 174.

It is noted that the filter 88 at the input to the Farrow circuitry of FIG. 31, and also the filtering circuitry 66, 68 at the output of the Farrow circuitry are constructed in the block polyphase format. Herein, by way of example, there are four signal channels in the block polyphase construction. The use of the four Mu formatters 176 in conjunction with the corresponding sets of four vector multiplexers 184 and four Farrow sub-blocks 174 enable the four channel processing of the signals of the filter 88 to be carried forward for processing in four parallel channels of the Farrow circuitry, whereupon the output signals of the Farrow circuitry are presented in four parallel channels to the to the filtering circuitry 66, 68. By comparing the signal flow paths of the Farrow circuitry of FIG. 31 (including the descriptions to be provided for FIGS. 32 and 33) with the description of the Farrow operation presented the above-noted article by Erup, it is observed that the circuitry of FIG. 31 accomplishes the Farrow operation in the block polyphase construction.

Figure 32:
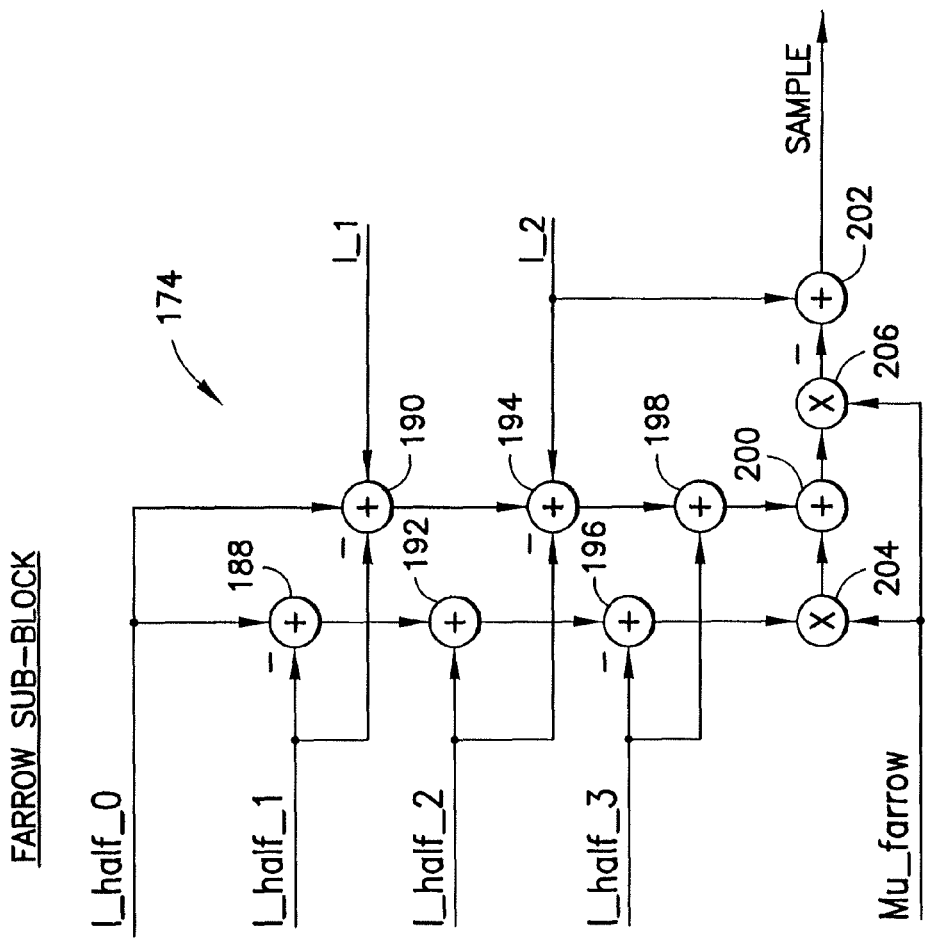

In FIG. 32, the circuitry of one of the Farrow sub-blocks 174 of FIG. 31 is disclosed, the circuitry being the same for each of the Farrow sub-blocks 174. In FIG. 32 the Farrow sub-block 174 comprises a set of summers 188, 190, 192, 194, 196, 198, 200 and 202, and two multipliers 204 and 206. Seven input signals are applied to the Farrow sub-block 174, these signals being identified also in FIG. 31, these signals including six signals from the vector multiplexer 184 and one signal from the Mu Formatter 176. The summers 188-202 serve to combine signals by addition wherein, in some cases indicated by a minus sign, subtraction is performed. The summer 188 combines the first two signals, and the summer 190 combines the first two signals with the signal I_1. The summer 192 combines the output of the 188 with the third input signal, and the summer 194 combines the output of the summer 190 with the third input signal and the signal I_2. The summer 196 combines the output of the summer 192 with the fourth input signal, and the summer 198 combines the output of the summer 194 with the fourth input signal. The multiplier 204 multiplies the output of the summer 196 by the Mu factor to produce a product which is summed by the summer 200 with the output of the summer 198. The output of the summer 200 is multiplied with the Mu factor by the multiplier 206, which product is summed with the signal I_2 by the summer 202 to provide an output sample for the filtering circuitry 66,68.

Figure 33:
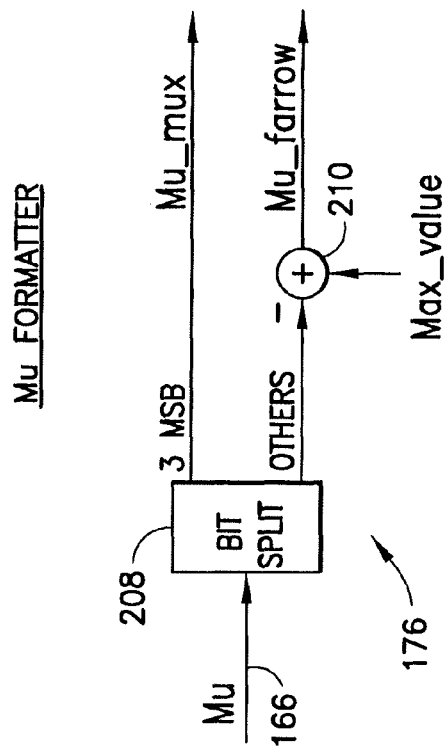

FIG. 33 shows operation of one of the Mu Formatters 176 for converting a timing signal on line 166 to a Mu signal suitable for operation of the vector multiplexer 184 and a Mu coefficient for operation of the Farrow sub-block 174. The same circuitry is employed in each of the Mu Formatters 176. The Mu formatter 176 includes a bit splitter 208 and a summer 210. The bit splitter 208 receives the time reference signal on line 166 and outputs the three most significant bits of the time reference signal to one of the vector multiplexers 184. The remaining bits are subtracted from a reference signal at the summer 210, with the resulting difference being the Mu coefficient for one of the Farrow sub-blocks 174.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A parallel-processing demodulator for processing an input signal to be received in a modem or communication system, the demodulator comprising parallel processing circuitry;

wherein said parallel processing circuitry comprises a plurality of circuit blocks arranged in a parallel array of signal-processing branches for concurrent processing of different portions of the input signal, one portion of said parallel processing circuitry in each of said branches being a matched filter, a second portion of said parallel processing circuitry in each of said branches being digital down-conversion circuitry, and a further portion of said parallel processing circuitry in each of said branches being a parallel fractional interpolator, the digital down-conversion circuitry and the parallel fractional interpolator being serially connected to the matched filter;

said demodulator further includes means for distributing said different signal portions to the circuit blocks;

said demodulator further comprises reference circuitry having plural numerically controlled oscillators for applying time reference signals and phase reference signals for driving circuit blocks of the parallel processing circuitry, such that the time reference signals drive the matched filter and the parallel fractional interpolator via one of said numerically controlled oscillators, and the phase reference signals drive the digital down-conversion circuitry via a second of said numerically controlled oscillators; and said parallel processing circuitry is constructed in programmable form for processing signals having different characteristics of modulation and coding.

2. A demodulator according to claim 1, wherein the input signal to the demodulator is digitally formatted, the demodulator further comprises a program memory, and each circuit block of the parallel processing circuitry is programmable and comprises an FPGA, a DSP, or an ASIC to provide one of a plurality of signal-processing functions in accordance with instructions stored in the program memory.

3. A demodulator according to claim 2, wherein a plurality of circuit blocks, located in the matched filter or the fractional interpolator constitute a block polyphase structure to provide a filter function.

4. A demodulator according to claim 3, wherein said branches of said block polyphase structure of the fractional interpolator provides a delay function.

5. A demodulator according to claim 2, wherein said digital down-conversion circuitry comprises a circuit block in a respective branch of said parallel processing circuitry to provide a frequency conversion function.

6. A demodulator according to claim 5, wherein the frequency conversion function is a down-conversion in frequency.

7. A demodulator according to claim 5, wherein the frequency conversion function converts said input signal to the demodulator to baseband.

8. A demodulator according to claim 2, wherein said reference circuitry is programmable and comprises an FPGA, a DSP, or an ASIC to provide one of a plurality of reference signal functions in accordance with instructions stored in said program memory.

9. A demodulator according to claim 8, wherein each circuit block of said parallel processing circuitry comprises an FPGA, and said reference circuitry comprises a DSP.

10. A demodulator according to claim 9, wherein a plurality of circuit blocks, located in the matched filter or the fractional interpolator constitute a block polyphase structure to provide a filter function, the filter function being a finite impulse response (FIR) for the block polyphase structure.

11. A demodulator according to claim 9, wherein the demodulator is a parallel DSP demodulator, and wherein a plurality of circuit blocks, located in the matched filter or the fractional interpolator constitute a block polyphase structure to provide a filter function for the parallel DSP demodulator, the filter function being an infinite impulse response (IIR) for the block polyphase structure.

12. A demodulator according to claim 1, wherein said distributing means comprises a demultiplexer.

13. A demodulator according to claim 12, wherein the input signal to the demodulator is constituted by an input sequence of signal pulses applied to said demultiplexer, and a pulse repetition frequency of each of a plurality of sub-sequences of signal pulses outputted by the demultiplexer to respective ones of the branches of said parallel processing circuitry is lower than a pulse repetition frequency of signal pulses of said input sequence of signal pulses to enable operation of said parallel processing circuitry at a reduced clock speed.

14. A demodulator according to claim 1, wherein a plurality of circuit blocks, located in the matched filter or the fractional interpolator constitute a block polyphase structure to provide a filter function, and wherein the circuit blocks of the block polyphase structure are arranged as a set of M block sections wherein each of the M block sections has N parallel signal channels, and in each block section a summing element is connected to output terminals of the N parallel signal channels, N and M being integers;

said distributing means comprises a demultiplexer connected to input terminals of the branches in respective ones of said M block sections.

15. A demodulator according to claim 1, wherein a plurality of circuit blocks, located in the matched filter constitute a block polyphase structure to provide a filter function, wherein a plurality of circuit blocks in the fractional interpolator constitute a a further block polyphase structure to provide a further filter function, and each circuit block in said block polyphase structures processes the signal of a separate signal channel, and wherein the circuit blocks in each of the block polyphase structures are arranged as a set of M block sections wherein each of the M block sections has N parallel signal channels, and in each block section, a summing element is connected to output terminals of the N parallel signal channels, N and M being integers;

said distributing means comprises a demultiplexer;

in each of said block polyphase structures, said plurality of circuit blocks arranged in said parallel array of signal-processing branches with the summing elements connected to the output terminals of the signal channels of the respective block sections constitute a first signal processing unit, and each of said block polyphase structures further comprises at least one more signal processing unit forming a series of interconnected processing units wherein output terminals of the summing elements of a first of said processing units connect to input terminals of circuit blocks of a succeeding one of said processing units; and said demultiplexer is connected to input terminals of circuit blocks of said first processing unit.

16. A demodulator according to claim 15, wherein said input signal of the demodulator is digitally formatted, the demodulator further comprises a program memory, and each circuit block of respective ones of said series of processing units comprises an FPGA, a DSP, or an ASIC to provide one of a plurality of signal-processing functions in accordance with instructions stored in the program memory.

17. A demodulator according to claim 16, wherein said reference circuitry is programmable and comprises an FPGA, a DSP, or an ASIC to provide one of a plurality of reference signal functions in accordance with instructions stored in said program memory.

18. A demodulator according to claim 17, wherein each circuit block of respective ones of said series of processing units comprises an FPGA, and said reference circuitry comprises a DSP.

19. A demodulator according to claim 17, further comprising an analog-to-digital converter coupled to said demultiplexer and driven by timing signals of said reference circuitry for converting the input signal received by the demodulator into said digitally formatted signal, and wherein said down-conversion circuitry precedes said block polyphase structure and provides for a down conversion in frequency, said series of processing units being serially connected, a further processing unit of said series of processing units providing a low pass filter function with decimation of signal samples, and still further ones of said processing units of said series of processing units having said matched filters provide also for equalization for reception of said input signal, said parallel fractional interpolator in each of said branches providing delay for reception of said input signal.

20. A demodulator according to claim 19 wherein output signals of said plurality of block polyphase structures are applied to said reference circuitry to provide estimates of time and phase, and wherein a timing feedback loop drives said analog-to-digital converter, and a phase feedback loop is responsive to said delay of said parallel fractional interpolator and said reference circuitry for driving said down-conversion processing unit.

21. A demodulator according to claim 20 wherein components of said timing feedback loop and of said phase feedback loop are constructed of programmable circuitry responsive to program instructions stored in said program memory.

22. A demodulator according to claim 21 wherein the programmable circuitry of said timing feedback loop and of said phase feedback loop is constructed as DSP.

23. A demodulator according to claim 21, wherein said parallel fractional interpolator includes Farrow circuitry.

24. A demodulator according to claim 1 wherein said matched filter is operative to process an input succession of samples of the signal of the demodulator to produce an output succession of filtered signal samples, wherein circuit blocks of the matched filter constitute a block polyphase structure and are arranged within a set of M filter sections, each of the M filter sections has N of the circuit blocks providing a corresponding N parallel filter channels, and wherein each of the M filter sections includes a summing element connected to output terminals of the N parallel filter channels;

wherein said distributing means comprises a demultiplexer for extracting a sequence of N input signal samples from the input succession of signal samples, and for distributing the N input signal samples respectively to the filter channels in each of the filter sections; and each of the circuit blocks is operative upon an input signal sample to provide a processed signal sample, the processed signal samples of the respective channels of each of the filter sections being summed by the summing element to provide one of said filtered signal samples in the output succession of the filtered signal samples.

25. A demodulator according to claim 24 wherein said circuit blocks comprise signal processing elements, and there are K different ones of said circuit blocks in said block polyphase structure, there is a mathematical relationship expressed by a matrix formulation among the input succession of signal samples and the output succession of signal samples based on an ordering of the K circuit blocks in a matrix of the matrix formulation, and an ordering of the circuit blocks among successive groups of K filter channels of a plurality of said filter sections is a permutation of said K circuit blocks in a row of said matrix.

26. A demodulator according to claim 25 wherein an ordering of the signal-processing elements among the channels of a first of said filter sections is permuted to provide an ordering of the signal processing elements among the channels of a second of said filter sections.

27. A demodulator according to claim 25 wherein there are N different orderings of the signal-processing elements among the N channels of each of the filter sections, the difference in the ordering being obtained by a permutation of the N signal-processing elements in each filter section.

28. A demodulator according to claim 25 wherein M equals N.

29. A demodulator according to claim 25 wherein M is greater than N to provide a decimation function.

30. A demodulator according to claim 25 wherein M is less than N to provide interpolation.

31. A demodulator according to claim 25 wherein, in said matrix, signal-processing elements lying below a diagonal of the matrix include a delay factor.

32. A demodulator according to claim 31 wherein the delay introduced by said delay factor is equal to the period of a clock interval of a clock driving each of said signal- processing elements.

33. A demodulator according to claim 32 wherein a pulse repetition frequency of signal pulses applied to one of said filter channels is lower than a pulse repetition frequency of signal pulses of said input succession of signal samples to enable operation of said signal-processing elements at a reduced clock speed.

34. A demodulator according to claim 1, wherein said matched filter is a block polyphase filter having parallel signal channels, and said parallel fractional interpolator has parallel signal channels coupled to the parallel channels of said polyphase filter; and the digital down-conversion circuitry is constructed of parallel channels coupled to the parallel channels of the polyphase filter for translating an input signal of said demodulator down to baseband.

35. A demodulator according to claim 34, wherein said reference circuitry comprises a timing reference circuit producing a timing reference having said time reference signals, a frequency reference circuit producing a frequency reference with said phase reference signals, and said demodulator further comprises an analog-to-digital converter coupled to said signal distributing means and driven by timing signals of said timing reference circuit for converting the input signal received by the demodulator into a digitally formatted signal, said timing reference circuit and said frequency reference circuit being constructed with parallel channels.

36. A parallel-processing demodulator for processing an input signal to be received in a modem or communication system, the demodulator comprising parallel-processing circuitry including a plurality of serially connected circuit elements disposed in each of a plurality of signal-processing branches of the parallel-processing circuitry, the arrangement of the circuit elements in the respective signal-processing branches constituting a parallel-processing element of the parallel processing circuitry, the parallel-processing circuitry comprising a plurality of parallel-processing elements of which an individual parallel-processing element provides for concurrent processing of different portions of the input signal to the demodulator; wherein one of said parallel-processing elements is a filter constructed of a plurality of filter elements located on respective ones of said branches, and constituting a block polyphase structure;

additional ones of said parallel-processing elements provide timing correction that includes decimation and/or interpolation, wherein the decimation is by fractional or integral values of a sampling time, and the interpolation is by fractional or integral values of the sampling time;

said demodulator includes means for distributing said different signal portions among the respective ones of said branches;

said demodulator further comprises reference circuitry for applying time reference signals and phase reference signals for driving the filter elements of respective branches of the parallel processing circuitry; and said parallel processing circuitry is constructed in programmable form for processing signals having different characteristics of modulation and coding.

37. A demodulator according to claim 36 wherein one of said parallel-processing elements providing interpolation comprises Farrow circuitry to provide delays of fractional values of the sampling time.

38. A demodulator according to claim 36, further comprising circuitry providing recovery of carrier frequency and phase, and digital phase shift for operation of the parallel-processing elements to enable coherent demodulation of the signal input to the demodulator.

* * * * *

UNITED STATES PATENT AND TRADEMARK OFFICE
CERTIFICATE OF CORRECTION

PATENT NO. : 7,697,641 B2
APPLICATION NO. : 10/878902
DATED : April 13, 2010
INVENTOR(S) : Haddadin et al.

It is certified that error appears in the above-identified patent and that said Letters Patent is hereby corrected as shown below:

Column 23, lines 61 and 62, after "wherein", delete "said branches of".
Column 24, line 55, after "constitute" delete "a".
Column 26, line 46, delete "signal- processing" and insert --signal-processing-- therefor.

Signed and Sealed this

Twenty-ninth Day of June, 2010

David J. Kappos
*Director of the United States Patent and Trademark Office*